United States Patent [19]

Karaki et al.

[11] Patent Number: 5,630,155
[45] Date of Patent: May 13, 1997

[54] PORTABLE COMPUTER SYSTEM WITH MECHANISM FOR ACCUMULATING MECHANICAL ENERGY FOR POWERING THE SYSTEM

[75] Inventors: Nobuo Karaki; Osamu Miyazawa, both of Suwa, Japan

[73] Assignee: Seiko Epson Corporation, Tokyo, Japan

[21] Appl. No.: 323,698

[22] Filed: Oct. 18, 1994

Related U.S. Application Data

[63] Continuation of Ser. No. 710,488, Jun. 5, 1991, abandoned.

[30] Foreign Application Priority Data

| Jun. 5, 1990 | [JP] | Japan | 2-146763 |
| Jun. 4, 1991 | [JP] | Japan | 3-160974 |

[51] Int. Cl.⁶ .................. H02P 9/04; G06F 11/30
[52] U.S. Cl. .................. 395/800; 363/73; 363/164; 363/178; 363/32; 322/28; 322/29; 322/44; 322/46; 322/71; 322/100
[58] Field of Search .................. 395/800; 364/DIG. 1; 363/73, 32, 164, 178; 322/28, 29, 44, 46, 71, 100

[56] References Cited

U.S. PATENT DOCUMENTS

| 3,552,350 | 1/1971 | Ranney et al. ............... 116/106 |
| 3,804,054 | 4/1974 | Gallagher ..................... 116/109 |
| 3,812,472 | 5/1974 | Mahood ....................... 340/172.5 |
| 4,169,992 | 10/1979 | Nash ............................ 322/29 |
| 4,393,464 | 7/1983 | Knapp et al. ................ 364/900 |
| 4,525,631 | 6/1985 | Allision ....................... 290/4 R |
| 4,631,527 | 12/1986 | De Witt et al. .............. 340/539 |
| 4,731,545 | 3/1988 | Lerner et al. ................ 290/54 |
| 4,748,559 | 5/1988 | Smith et al. ................. 364/200 |
| 4,766,567 | 8/1988 | Kato ............................. 364/900 |
| 4,835,681 | 5/1989 | Culley .......................... 364/200 |
| 4,893,271 | 1/1990 | Davis et al. .................. 364/900 |
| 5,025,387 | 6/1991 | Frane ........................... 364/439 |

FOREIGN PATENT DOCUMENTS

| 56-11540 | 1/1981 | Japan . |
| 64-44134 | 2/1989 | Japan . |
| 1054166 | 1/1967 | United Kingdom . |

Primary Examiner—Alpesh M. Shah
Assistant Examiner—Dzung C. Nguyen
Attorney, Agent, or Firm—Oblon, Spivak, McClelland, Maier & Neustadt, P.C.

[57] ABSTRACT

An embodiment of the the present invention is a computer system comprised of a main computer circuit having an interruptible CPU, a control program stored in memory connected to the CPU with interrupt procedures, and a power supply that has a mainspring and winder, a generator, a regulator, a power supply, and an internal battery. The power supply is able to accept electrical power from the generator-regulator combination, house current (line voltage) through a standard outlet plug, and the battery. A user is able to input his own kinetic energy into the system by turning a winding key. The action is similar to winding up a large windup alarm clock. A pair of detectors connected to the mainspring sense when the mainspring is fully wound and when it is almost unwound. The unwound condition will interrupt the CPU and one of the interrupt procedures will bring the system to a controlled shut-down. The fully-wound condition will cause the system to be re-enabled to run normally. Both the line voltage and hand-cranking of the mainspring can alternatively be used to recharge the battery.

22 Claims, 21 Drawing Sheets

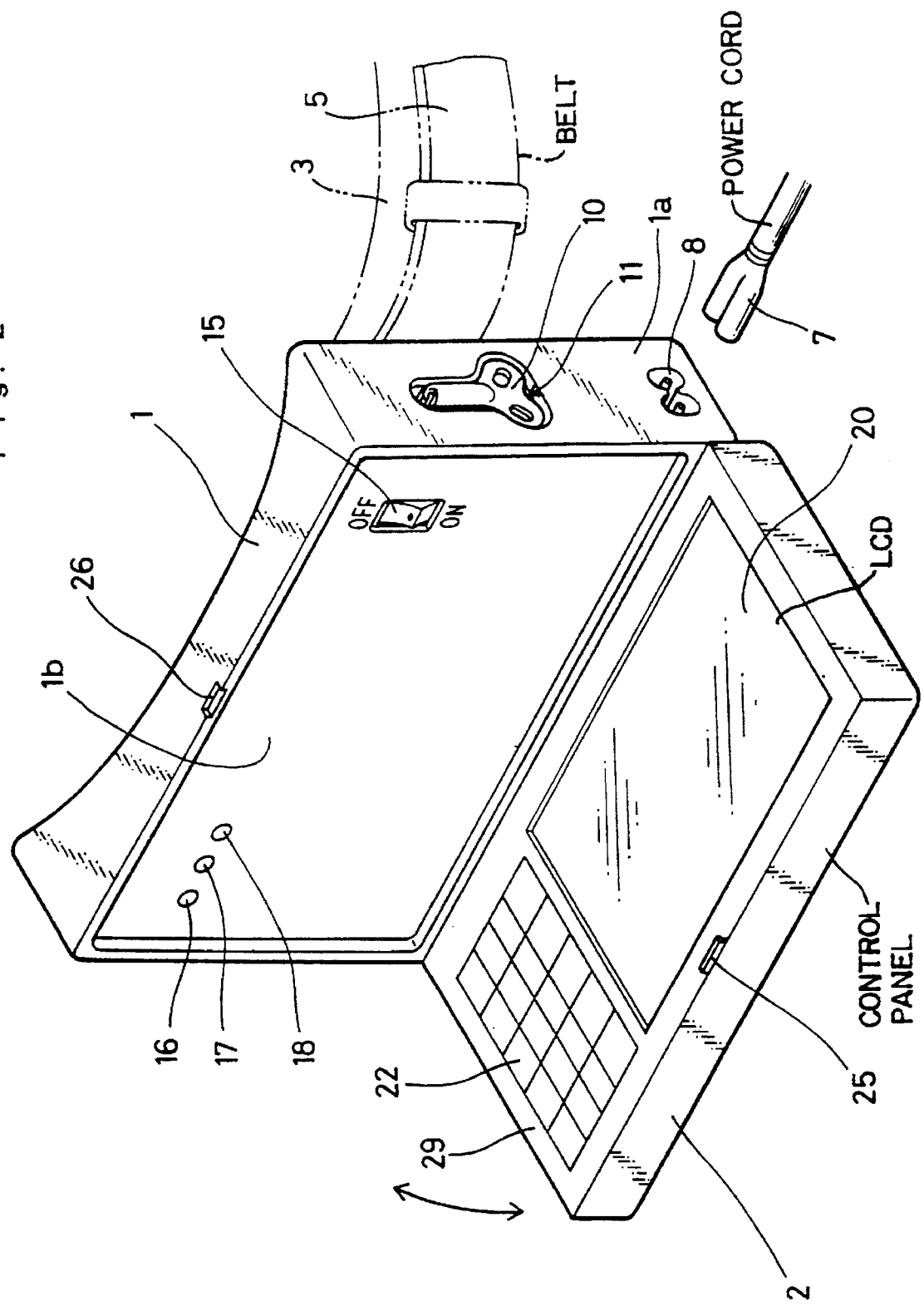

PORTABLE COMPUTER SYSTEM WITH MECHANISM FOR ACCUMULATING MECHANICAL ENERGY FOR POWERING THE SYSTEM

This application is a Continuation of application Ser. No. 07/710,488, filed on Jun. 5, 1991, now abandoned.

BACKGROUND OF INVENTION

The present invention relates generally to a portable computer with mechanism for accumulating mechanical energy for powering the system. It also relates to power supplies for portable electronic equipment and especially to mechanical energy systems able to generate electricity to run low-power portable devices, such as personal computers.

There is a "first generation" computer in a Boston, Mass., computer museum that was made in the 1950's and which fills an entire room with racks, wires, and tubes. The power needed to run the computer is enormous, and the heat generated by the system requires its own air conditioning and cooling system. Second generation computers were designed to use transistors, instead of tubes, and were much smaller, about the size of a large desk, and used much less power. The third generation of computers replaced the discrete transistors with integrated circuits (ICs) and were smaller and used still less power.

Apple Computer, IBM Corporation, and Compaq Computer have popularized the portable computer in recent years. Most models consume enough power to require plugging in to house current, but a few are battery operated. Many so-called "laptop" computers are battery operated, and these typically use LCD display panels instead of CRTs. The glass tube CRTs require a heater current and high voltage second anode potentials, and would drain a battery very quickly. Recent advances in CMOS IC device technology have allowed the production of whole digital systems that can run on fractions of watts. Batteries and the small size of laptop computers allow them to be used literally on the laptop of an airplane passenger while in flight. But there, and other places as well, there is no opportunity to run the computer on house current or to recharge a rundown battery. Spare batteries need to be kept, and replacing them in such situations often proves to be difficult and always disruptive of the work. Recharging a battery also requires a recharger, and these are often awkward and bulky, and therefore are many times left behind.

Alternative energy sources to power portable equipment have existed since before Thomas Edison invented the light bulb and his AC power distribution system to supply the bulbs in homes and businesses. Telephones that sported hand cranks actually contained magnetos that were used to generate a ring current at the other end of the wire to signal that the caller (cranker) wanted attention. Some small engines have magneto ignition systems that eliminate the need for a battery and ignition points. A magnet in the flywheel swings by a pickup coil, and a step-up transformer transforms the current induced to a high voltage that is applied to a spark plug. One-man or two-man hand-crank generators were used during World War II to power emergency radio gear to summon rescue. Batteries could not be relied on in the 1940s to be fresh when the emergency arose. The now old electrical and electronic equipment above used a lot of power, and vigorous cranking was needed just to maintain the output. Thomas Edison also produced a line of hand-cranked phonographs that were purely mechanical. In the United States, these became less popular and were antiquainted by the introduction of commercial 110 VAC electricity to ordinary homes in the 1920s and 1930s.

Watches have recently gone from mechanical to electronic mechanisms and power sources. Wind-up watches with mainsprings have been supplanted by quartz watches that need batteries. The batteries must be replaced every year or two, but that is often preferably to having to remember to wind the watch every day. Self-winding watches have existed as another alternative, and these operate by attaching a weighted pendulum through a ratchet to the mainspring. The weighted pendulum will swing around, as the watch on a user's arm is moved, and wind the mainspring.

Solar power is more and more a practical way of powering electronic devices. Texas Instruments (TI) makes a portable, handheld calculator that has no batteries and runs simply on ambient light. The TI-1795 calculator uses so little power, due to its CMOS circuitry, that a 1 cm by 3 cm solar cell is enough to power the calculator in ordinary office light. (See, U.S. Pat. Nos. 3,819,921; 3,921,142; 3,932,846; 4,115,705; 4,208,720; and 4,348,733.) Even so, a larger system such as a computer, would need a much larger solar panel, and good lighting cannot always be assured.

FIGS. 1A and 1B illustrate typical ways prior art computers have been powered. An AC adaptor supplies input power to a power supply whenever house current (e.g., 110 VAC) is available. This power can be used to both supply a main computer circuit and a battery charger. Whenever AC power is not available, a rechargeable battery takes over and the DC power supply unit regulates the voltage to the main computer circuit. In FIG. 1B, two batteries Mb and Sb, one secondary, are used to give longer battery operation. These batteries may or may not be rechargeable. Secondary battery Sb can be used to ensure uninterrupted operation of the computer during replacement of main battery Mb. A lithium back-up battery BU is commonly used to keep internal clocks going (e.g., calendar and time) and to retain data in memory within main computer circuit CP.

Although batteries give prior art computers and other devices a temporary degree of freedom, eventually the unit must be plugged in and/or the batteries recharged. But if the temporary use exceeds the time the batteries will last, a problem develops, especially if the user is traveling a long distance by plane or train, where ordinary house current is not available. Fresh batteries can be carded along, but the principal advantage of a portable computer would be nullified if many loose pieces have to be carried too. Such computers are not practical for use in jungles, caves, on the high seas, in desert areas, large-scale disaster areas, or other field uses where any reasonable supply of fresh batteries would be exhausted and no opportunity to connect to commercial power exists.

SUMMARY OF THE INVENTION

An object of present invention is to provide a system that frees computers and other electronic equipment for use over extended periods of time in "the field" where practically the only available long-term availability energy source is mechanical.

An embodiment of the present invention is a computer system comprised of a main computer circuit having an interruptible CPU, a control program stored in memory connected to the CPU with interrupt procedures, and a power supply that has a mainspring and winder, a generator, a regulator, a power supply, and an internal battery. The power supply is able to accept electrical power from the generator-regulator combination, house current (line voltage) through a standard outlet plug, and the battery. A user is able to input his own kinetic energy into the system by turning a winding key. The action is similar to winding up a large windup alarm clock. A pair of detectors connected to the mainspring sense when the mainspring is fully wound and when it is almost unwound. The unwound condition will interrupt the CPU and one of the interrupt procedures will bring the system to a controlled shut-down. The fully-wound condition will cause the system to be re-enabled to run normally. Both the line voltage and hand-cranking of the mainspring can alternatively be used to recharge the battery.

An advantage of the present invention is that it allows portable electronic equipment to be used for extended periods of time in locations that do not have operating electrical power systems available.

A further advantage of the present invention is that the number of batteries in an electronic system can be reduced while at the same time increasing the operational availability of the system.

Other objects and attainments together with a fuller understanding of invention will become apparent and appreciated by referring to following description and claims taken in conjunction with accompanying drawings.

BRIEF DESCRIPTION OF DRAWINGS

FIG. 2 is a three-dimensional perspective view of an exemplary portable computer that represents a first embodiment of the present invention;

FIG. 8A shows how the detector pin is free to peek out through a slot and bend when the mainspring unwraps from the spindle. FIG. 8B shows the detector pin being constrained and straightened by the mainspring when it wraps the spindle;

DETAILED DESCRIPTION OF THE EMBODIMENTS

Figure 1A:
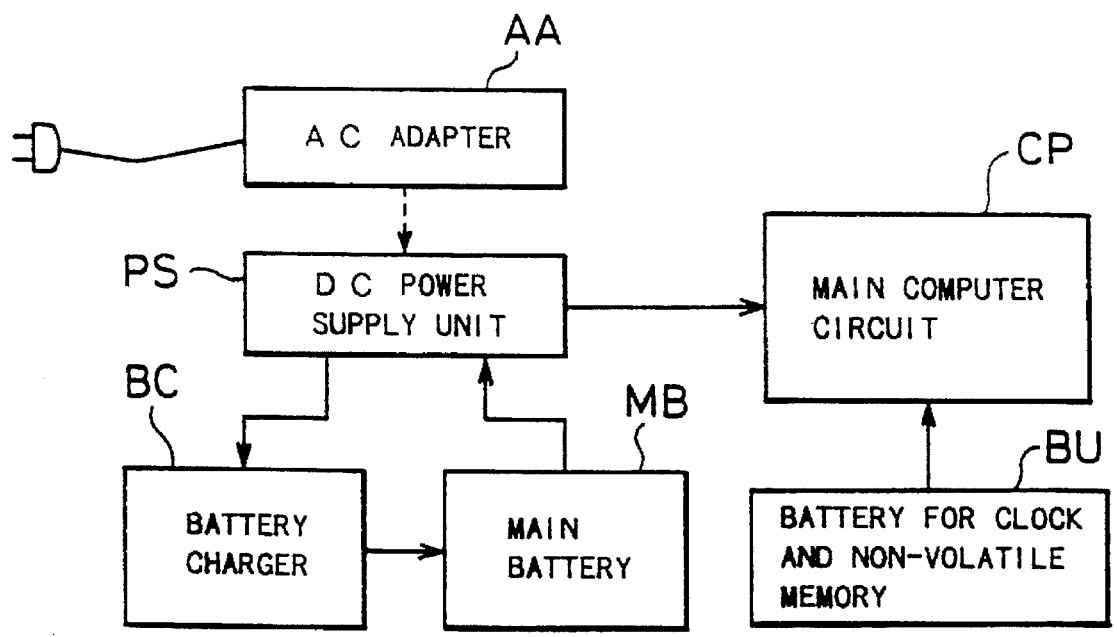
FIGS. 1A and 1B are block diagrams of typical prior art computer systems.
Figure 1B:
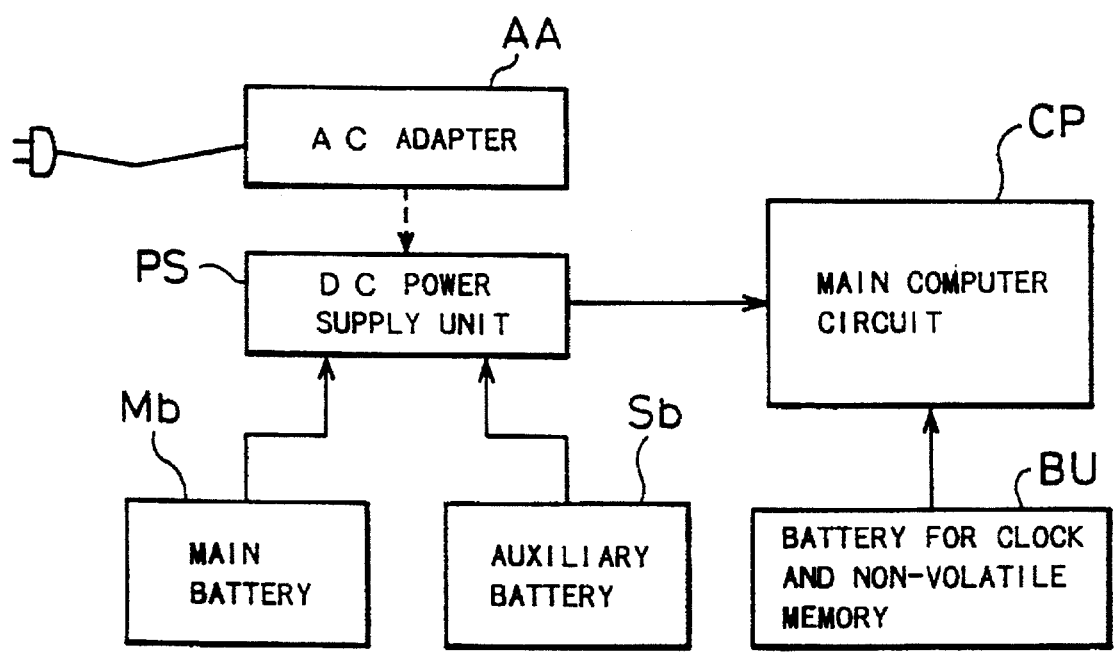

FIG. 2 shows the outside look of a first embodiment of the present invention, which is a portable computer system comprising a main unit 1 and a control panel 2 hinged to main unit 1. The rear of main unit 1 is concave to fit comfortably against a user's body. A belt 5 can be used to secure both a user's trousers 3 (for example) and main unit 1. A power cord 7 plugs into a line voltage receptacle 8. A spring winder handle 10 is located on a side 1a and folds away in a cavity 11. Alternatively, winder handle 10 could be removable. Side 1b has an on-off power switch 15, a voltage drop alarm light-emitting diode (LED) 16, a computer reset indicator LED 17, and a power-on indicator LED 18 and are closed inside when panel 2 is folded up. Inside panel 2 is located a liquid crystal display (LCD) 20 and a keyboard 22. A claw hook 25 mates with a clip 26 to latch panel 2 closed.

Figure 3A:
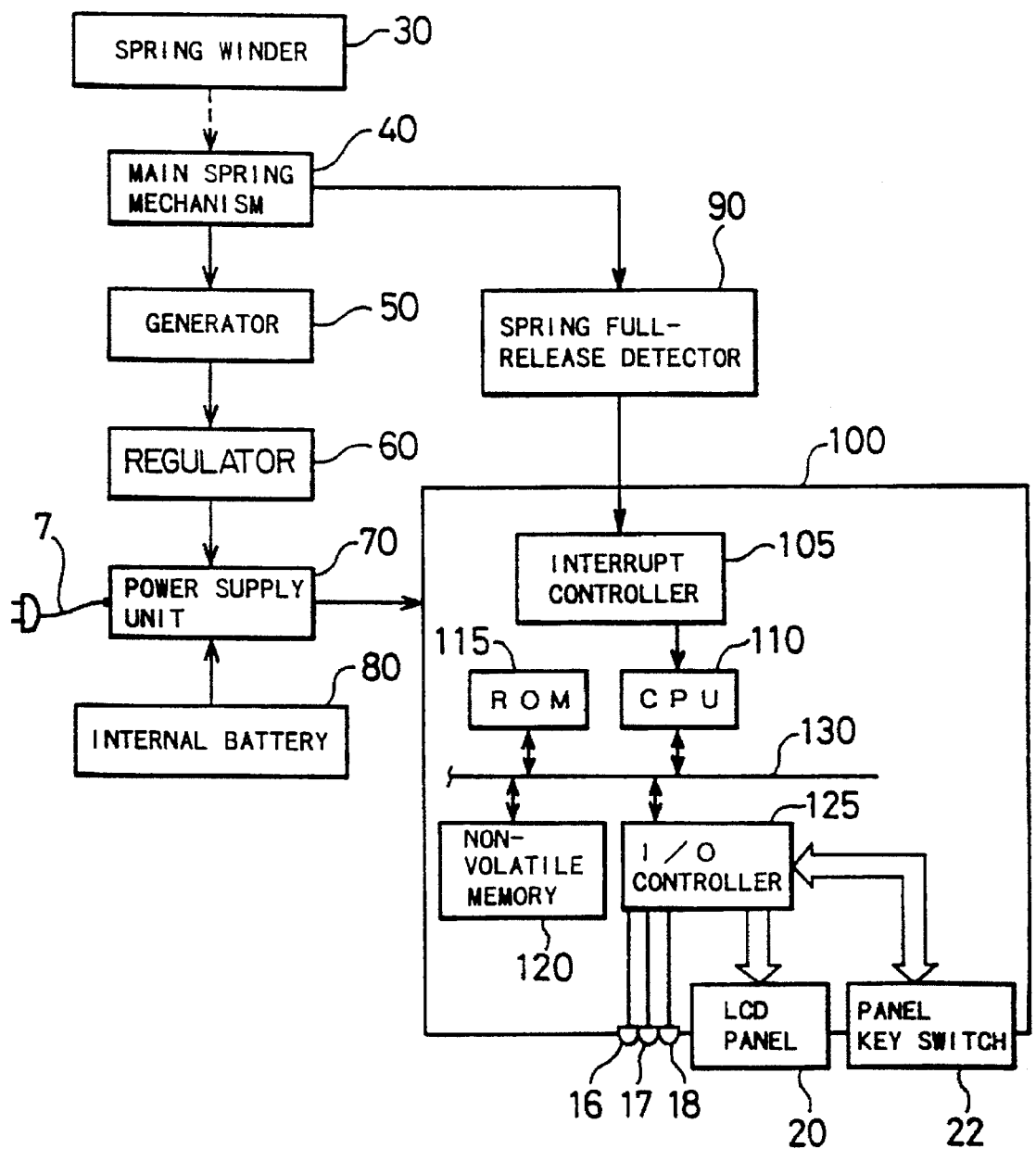
FIG. 3A and FIG. 3B are block diagrams of the computer of FIG. 2.
Figure 3B:
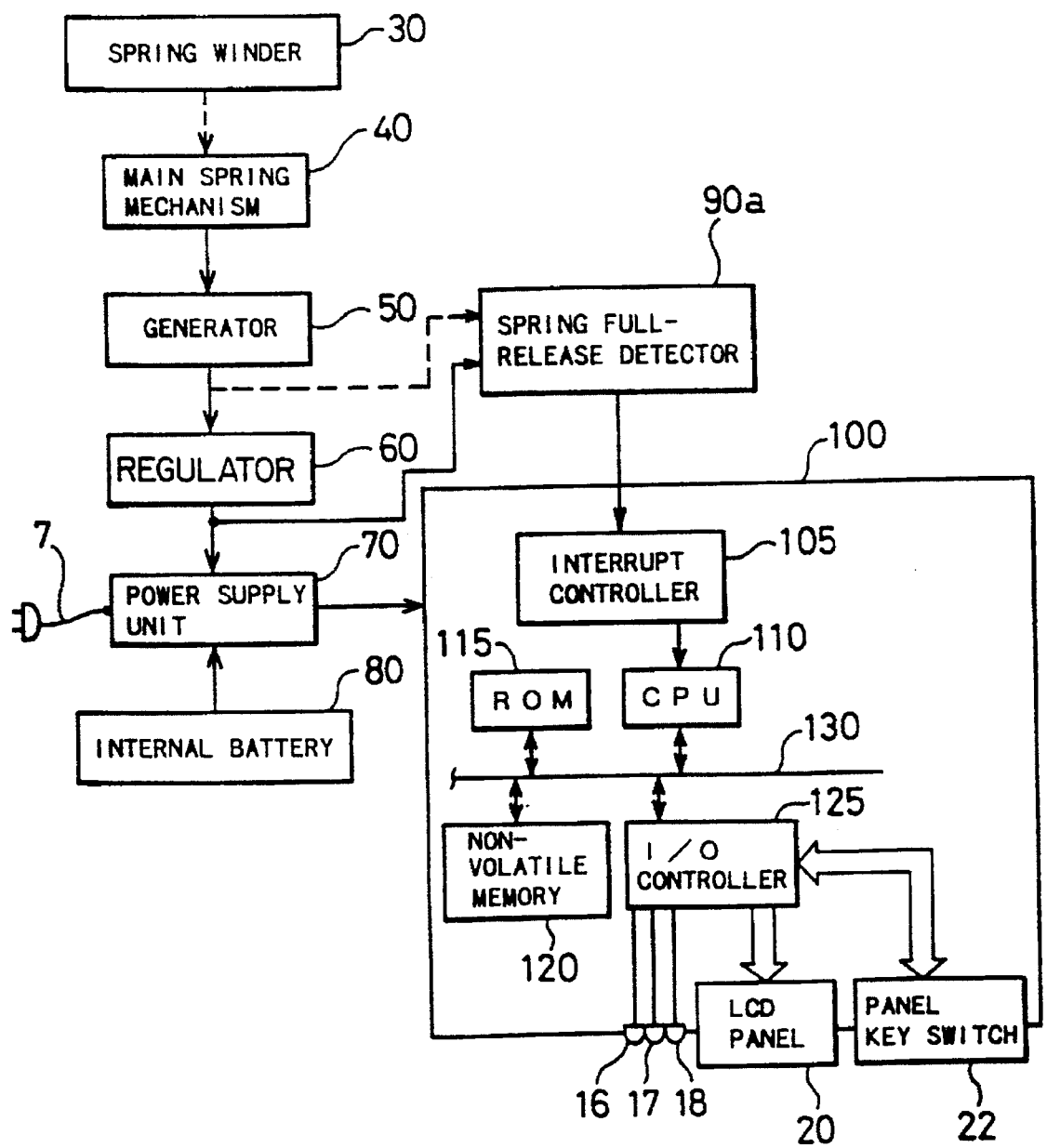

Referring to FIG. 3A, a spring winder 30 (e.g., handle 10 in FIG. 2) turns a mainspring 40 which stores mechanical energy and drives a generator 50 over a relatively long period of time, typically a few minutes to several hours, depending on the size of mainspring 40 and associated mechanisms. A regulator assembly 60 controls the electrical output of generator 50 and is one source to a power supply unit 70. An internal battery 80 (e.g., 12 volt) is an alternative source to power supply 70 as well as is power cord 7 when connected to line voltage. A spring-unwound detector 90 monitors mainspring 40 and will signal its status to a main computer circuit 100. Power supply 70 supplies operating power to main computer circuit 100, and when the mainspring 40 is the source of power, the detector 90 will signal main computer circuit 100 to shut-down in a controlled, safe manner. FIG. 3B shows an alternative method of detecting when mainspring 40 is about to quit delivering power to generator 50. An alternative detector 90a is electronic and can sense the near exhaustion of mainspring 40 by the drop in voltage, current, and/or frequency at the output of generator 50 or regulator 60. The main computer circuit 100 comprises an interrupt controller 105, a central processing unit (CPU) 110, a read only memory (ROM) 115, a non-volatile type read/write memory 120, and an I/O controller 125, all organized around a system bus 130. Memory 120 can be disk, EEPROM, "flash", battery-backed up CMOS SRAM, or the like. Which type is best while depend mainly on how much current it consumes. The I/O controller 125 interfaces to LCD panel 20, keyboard 22 and LEDs 16–18 (see, FIG. 2). ROM 115 stores a control program executed by CPU 100. Any data and user commands are input to CPU 110 from keyboard 22, and processing results are displayed on LCD panel 20 and LEDs 16–18 via I/O controller 125.

Figure 4:
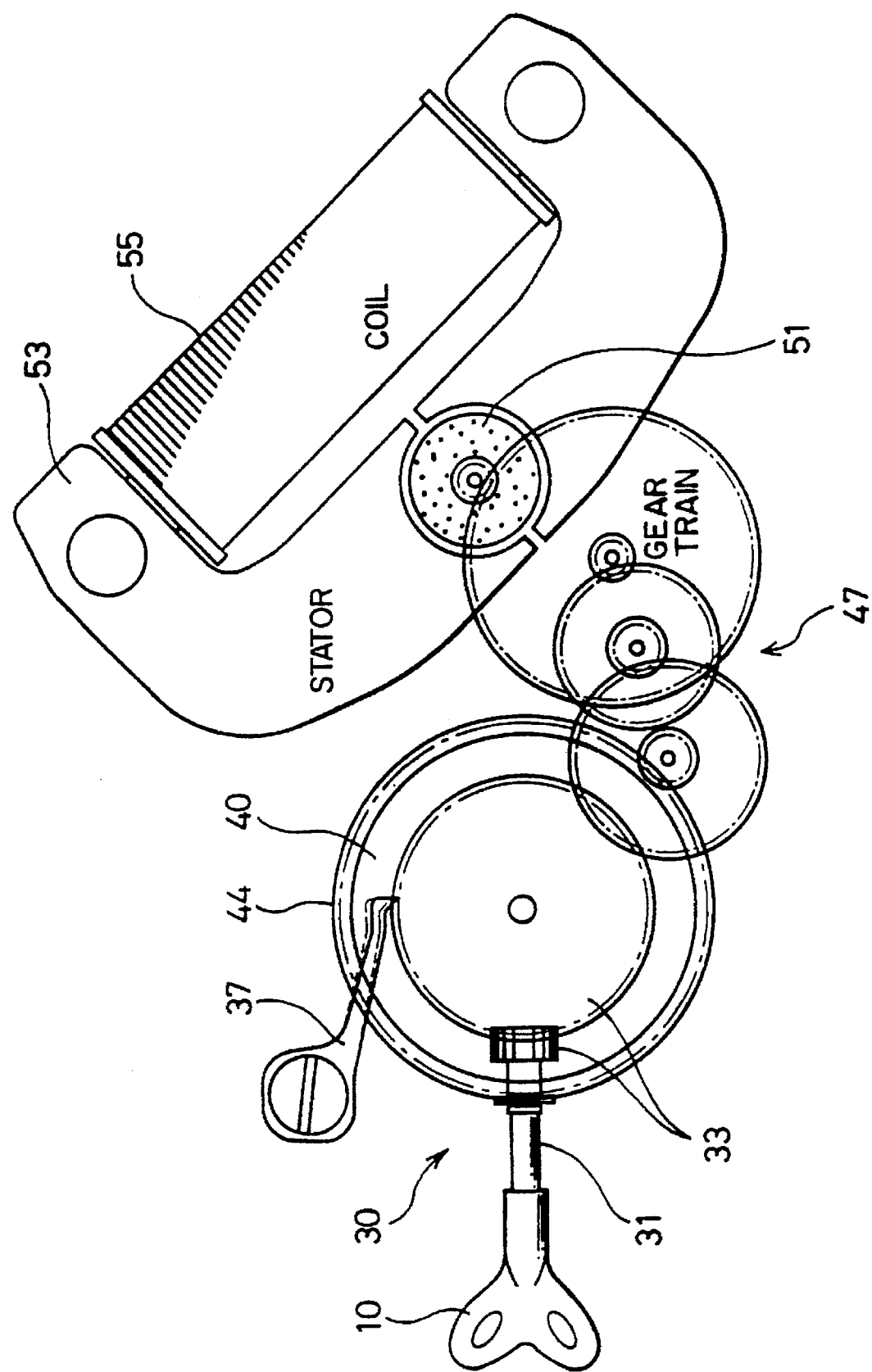
FIG. 4 is a plan view of the spring winder and generator, and gear system in between, belonging to the computer of FIG. 2.
Figure 5:
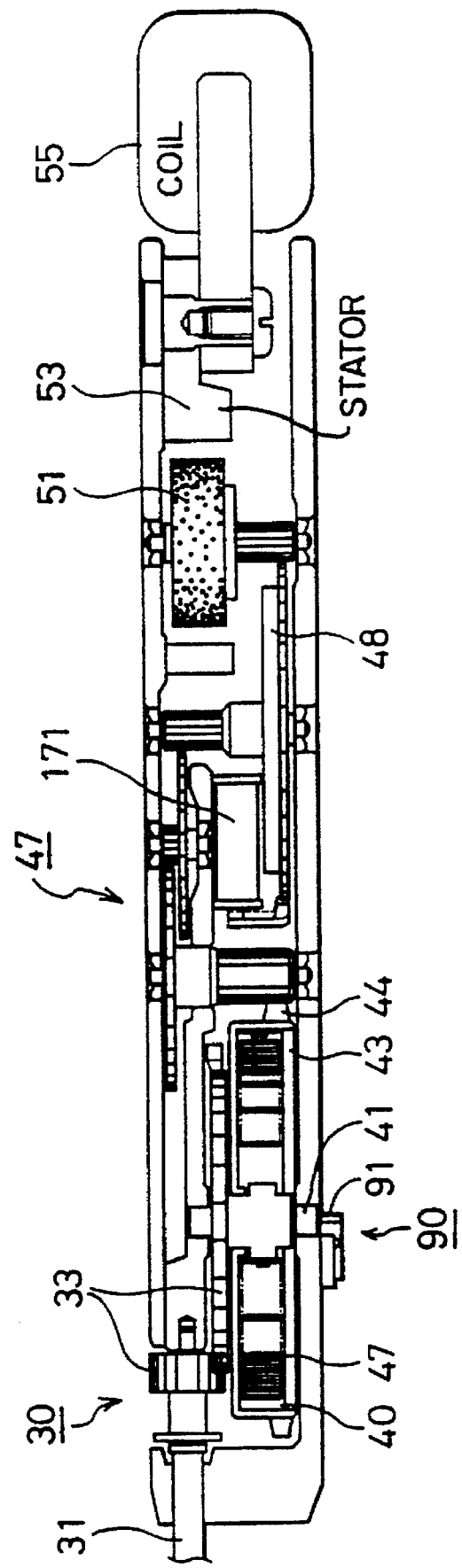
FIG. 5 is a cross sectional view of the assembly of FIG. 4.

The following description regarding the mechanics of the above system refers to FIGS. 4 and 5. Mainspring 40, as it unwinds, drives generator 50 through a gear train 47 and a flywheel 48. Alternatively, flywheel 48 can be omitted. (For the sake of clarity, gear train 47 and flywheel 48 were not shown above in FIG. 3.) The force of mainspring 40 unwinding is converted into alternating electrical current by generator 50 and applied to regulator assembly 60. Alternatively, generator 50 can be a DC type, and that would eliminate the need for regulator 60 to rectify the output of generator 50. To be efficient, the output voltage of generator 50 and the voltage of regulator assembly 60 should be relatively high, both at least ten volts, and preferably they are on the order of the voltage of battery 80. Spring winder 30 comprises of winder handle 10, a winder shaft 31 which turns with winder handle 10, a gear assembly 33, and a pawl 37 which will prevent gear assembly 33 from reversing. Gear assembly 33 converts the turning of winding shaft 31 into a rotation of spindle 41 for mainspring mechanism 40.

Figure 6A:
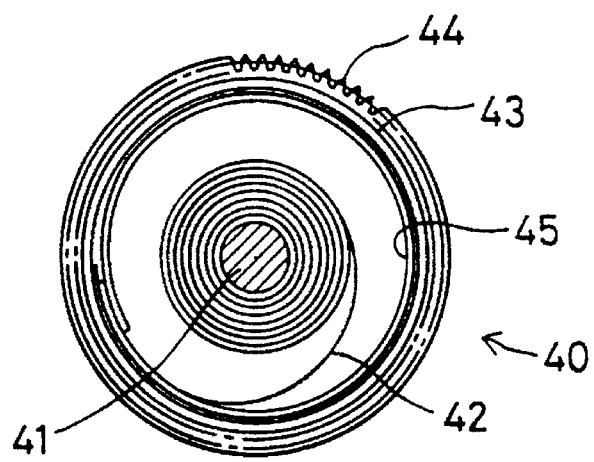
FIGS. 6A, 6B and 6C show the mainspring in the assembly of FIG. 4 wound, half-unwound, and completely unwound, respectively.
Figure 6B:
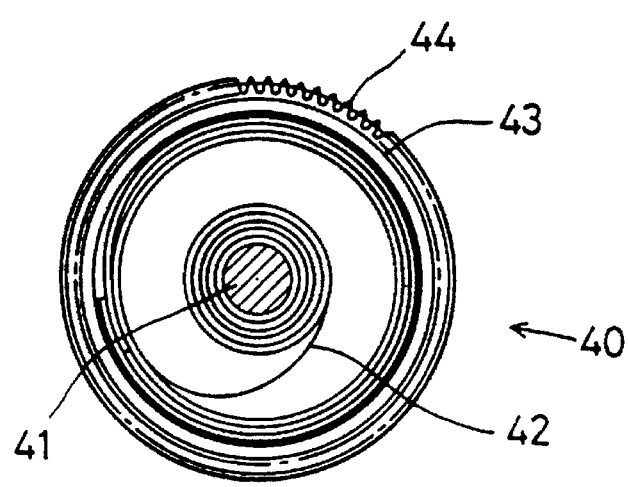
Figure 6C:
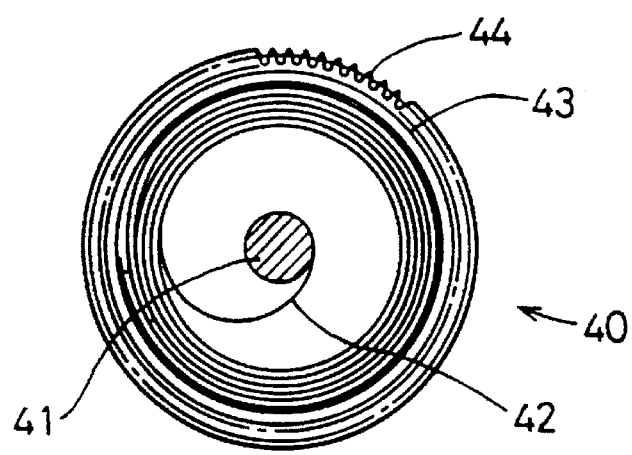

In FIGS. 6A to 6C, mechanism 40 is shown to comprises of a hollow spindle 41 to which is attached one end of a flat spiral mainspring 42, and both are housed in a barrel 43. A barrel gear 44 is located on the outer rim of barrel 43. A clutch 45 is on the inner rim of barrel 43. Clutch 45 prevents mainspring 42 from being overwound. If winder handle 10 is wound after mainspring 42 has already been fully wound, clutch 45 will slip to prevent damage. The maximum rotational torque $T_{max}$ of a fully-wound mainspring 42 is expressed by formula (1):

$$T_{max} = E\ b\ p\ n\ t^3/(6\ L) \tag{1}$$

The following describes variables, and those in parentheses are values of mainspring 42 utilized in this embodiment. Term E is Young's modulus, or the modulus of direct elasticity (20,000 kgw/mm$^2$); t is the thickness of flat spiral mainspring 42 (e.g., 1 mm); b is its width (e.g., 5 mm); L is its length (e.g., 2.0 meters); and n is the total number of turns (e.g., 25). Other dimensions are possible, these values are merely used here for purposes of this illustration. The maximum rotational torque $T_{max}$ in this example is 327 kgw mm. In order to simplify the calculation, the average rotation torque T is approximated by the equation $T=T_{max}/2$. The rotational torque expressed in watts, W, is approximately 70 milliwatt/hours, and is found using the following formula:

$$W = q\ T_{max}/2 = n\pi T \tag{2}$$

Therefore, the above exemplary mainspring mechanism 40 can generate between 30 to 50 milliwatt/hours of electric power after considering mechanical loss and generator efficiency. Referring to FIG. 4, as mainspring 42 unwinds, barrel 43 carries along gear 44 on its outer rim. The turning of gear 44 is transmitted to gear train 47. One of gears in gear train 47 (e.g., the last gear driving rotor 51) has flywheel 48 mounted to it.

Figure 7:
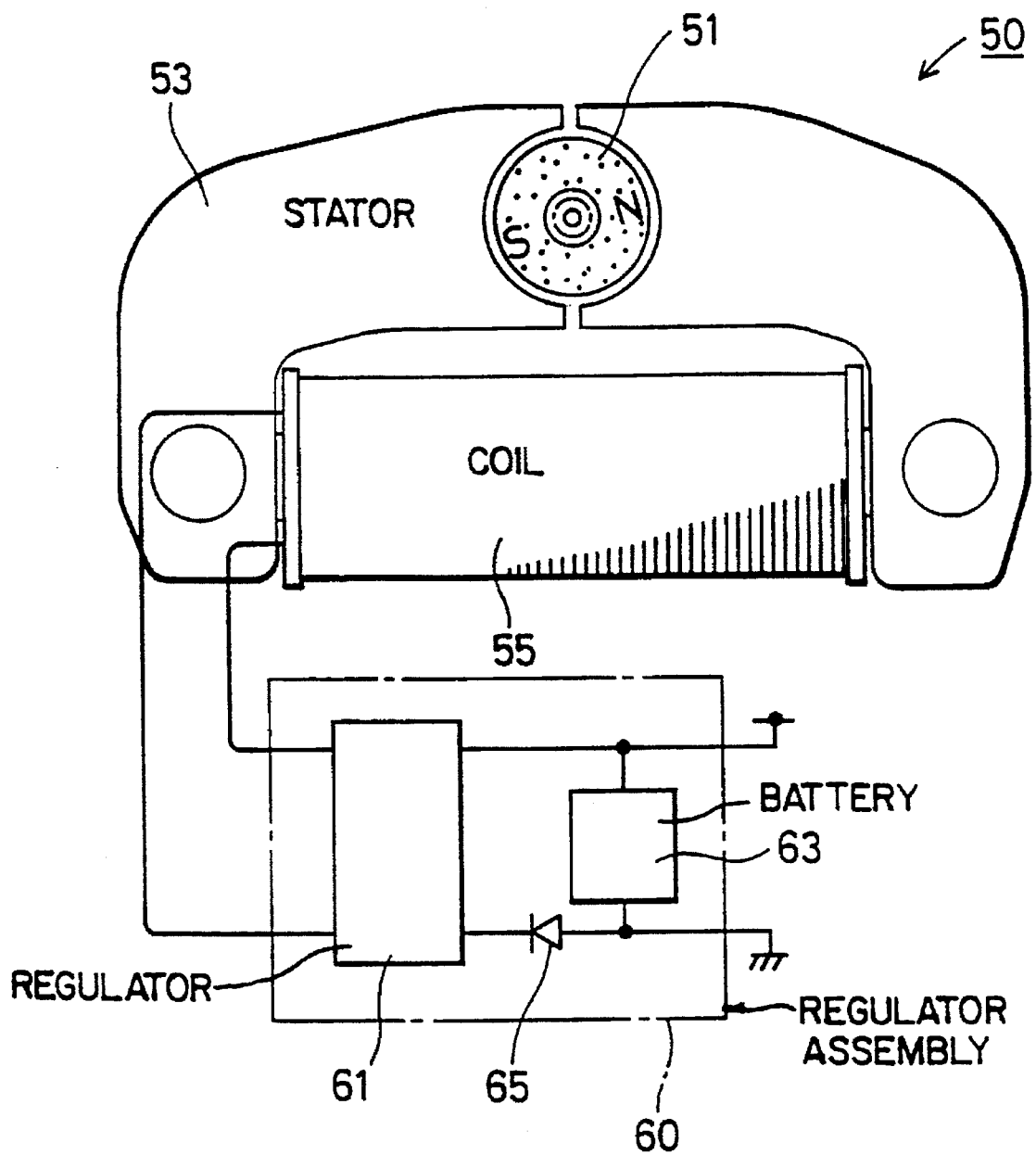
FIG. 7 is a schematic diagram of the output connection and regulating system for the generator in the assembly of FIG. 4.

In FIG. 7, the mechanical input to generator 50 is rotor 51. The rotor, as is conventional, contains a permanent magnetic having north-south (N-S) poles that revolve within a stator 53. An alternating magnetic field is thereby created, and an AC current is induced in coil 55 and converted to a useful DC power by regulator assembly 60. As FIG. 7 shows, the two terminals of power generating coil 55 are connected to a regulator 61. When a voltage is induced in coil 55, a current flows through regulator 61, diode 65, and battery 63. Regulator 61 protects battery 63 from being over-charged by generator 50. Battery 63 can alternatively be substituted by a sufficiently large capacitor that will smooth any voltage ripples at the output to tolerable levels. The exact load configuration will determine how much ripple can be tolerated.

Figure 8A:
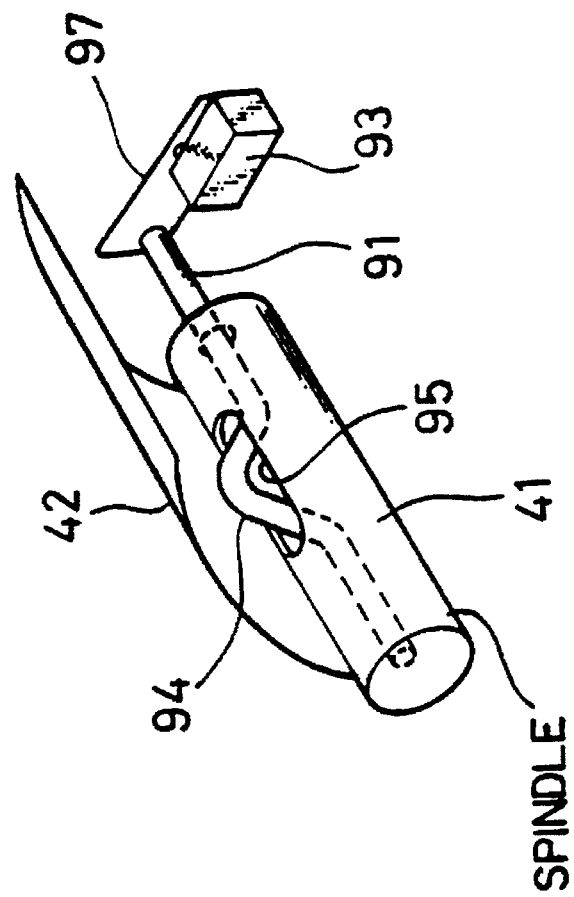
FIG. 8A and 8B show the "mainspring unwound" detector assembly.
Figure 8B:
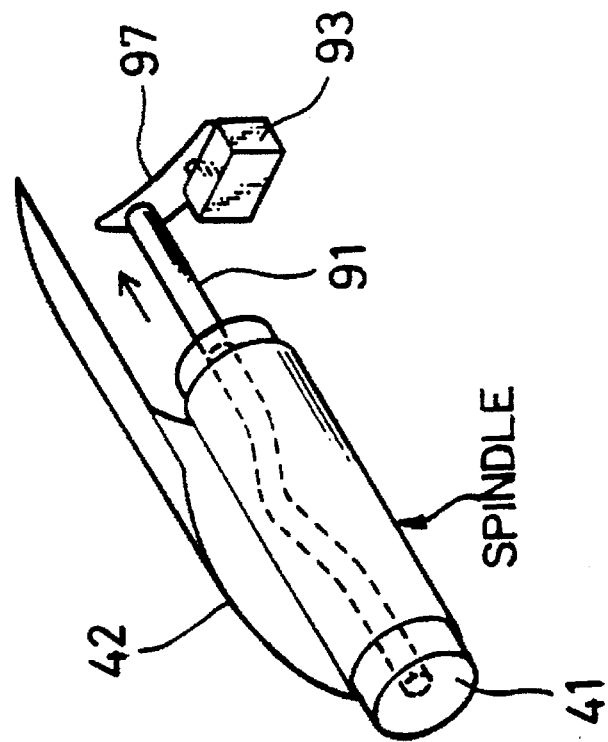

FIGS. 5, 8A, and 8B, show the placement and make up of a detector assembly 90 which is comprised of a detector pin 91 and a limit switch 93 positioned at one end of detector pin 91. Detector pin 91 fits inside hollow spindle 41 and is warped such that a bend 94 in it peeks through a slot 95 when mainspring 42 is fully unwound. When bend 94 peeks through slot 95, pin 91 will pull away from lever 97 of switch 93. When mainspring 42 is wound on spindle 41, detector pin 91 is forced to straighten out at bend 94, and pin 91 presses lever 97 which operates limit switch 93. The arrangement is such that switch 93 operates before spring 42 is completely unwound. As an alternative optical detection of mainspring 42 unwinding, the upper lid of barrel 43 can be made transparent and optical detectors placed at key points. Still another alternative is to incorporate a 25:1 reduction gear train, for example, to reduce the rotations of barrel 43 which houses 25-turn mainspring 42 to one rotation, and place a limit switch which at a notch on the gear. In this case, notch position should be located such that the limit switch trips immediately before mainspring 42 is completely unwound. As shown in FIG. 3B, a spring-unwound detector 90a can comprises a voltage detector monitoring either the output of generator 50 or regulator 60, or with a frequency detector on output of regulator 60. Immediately before mainspring 42 completely unwinds, detector 90 outputs an interrupt to controller 105. So, whatever alternative is selected, the main computer circuit 100 will display an alarm warning the user to wind the unit back up.

Figure 9:
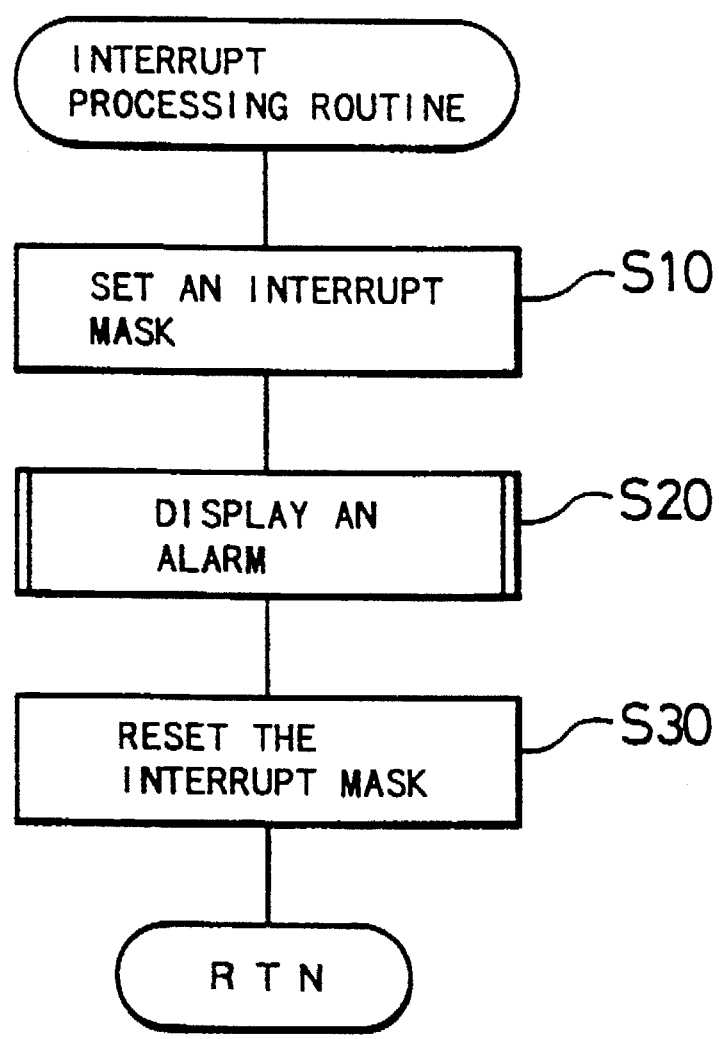
FIG. 9 is a flowchart of an exemplary interrupt service routine run by the CPU of the computer of FIG. 2.

A simplified interrupt service routine for handling the unwound mainspring warning is shown in FIG. 9. When this interrupt processing routine starts, an interrupt mask is set to screen out lower priority interrupts that may come in, in step S10. At a step S20, a sub-routine is called that displays an alarm message on LCD panel 20. Step S30 then restores the previous interrupt mask and a return is made. The alarm message displayed could be any of a number phrases, including "IMMEDIATELY WIND SPRING", or a blinking icon of a spring could be used. Audible alarms could also be used, the choice is one that should be made to suit the intended use. Even after an alarm is given, mainspring 42 still has a little torque left in it, and some electric power will be stored in rechargeable battery 63. So even if mainspring mechanism 40 is not wound immediately after the alarm, use of the computer could continue so long battery 63 can hold up. If the voltage of battery 63 is in danger of dropping too low, CPU 110 will turn on LED 16. A discharged battery 63 can be charged either by winding the mainspring mechanism several full cycles, or from an external source, such as a commercial power supply, after returning to where such a source is available. Since a portable computer like the above does not need to rely on external power, it can give continuous service in the field, so long as the mainspring mechanism 40 is wound by user when the need is annunciated by the computer.

The above portable computer can be easily carried about on a user's waist. It can also give good service during various kinds of explorations, or in a disaster area, because it is so portable. Moreover, the small size of spring winder 30, handle 10, and associated mechanisms help make the whole unit very small and lightweight.

Figure 10:
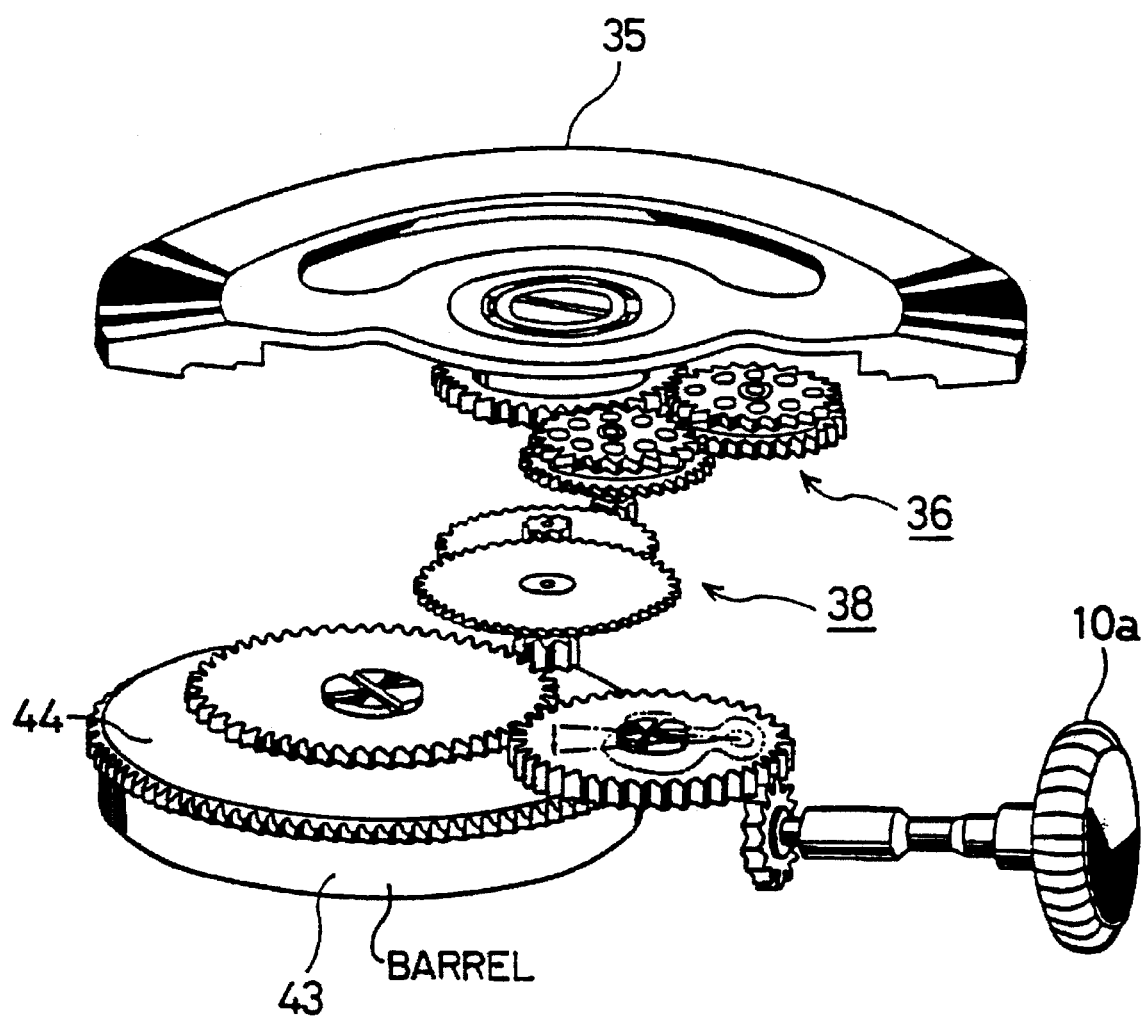
FIG. 10 is a three-dimensional perspective and cut-away view of an exemplary automatic mainspring winding mechanism.

FIG. 10 shows a couple alternatives to spring winding. A button-shaped handle 10a may be used in place of the key type handle 10. An automatic winding mechanism can also be incorporated that comprises an oscillating weight 35, similar to those found in self-winding watches. The weight 35 swings around randomly by virtue of vibrations and tilting caused by a user's walking about or jostling of the system. A double converter wheel mechanism 36 changes the random bi-directional turning of oscillating weight 35 into unidirectional rotational motion able to do useful work. This is then coupled to gear train 38 and spindle 41 in barrel 43. In the embodiment shown in FIG. 10, mainspring 42 winds up and collects energy whenever the user walks around with it. This feature reduces or eliminates the need to manually wind the unit.

Figure 11:
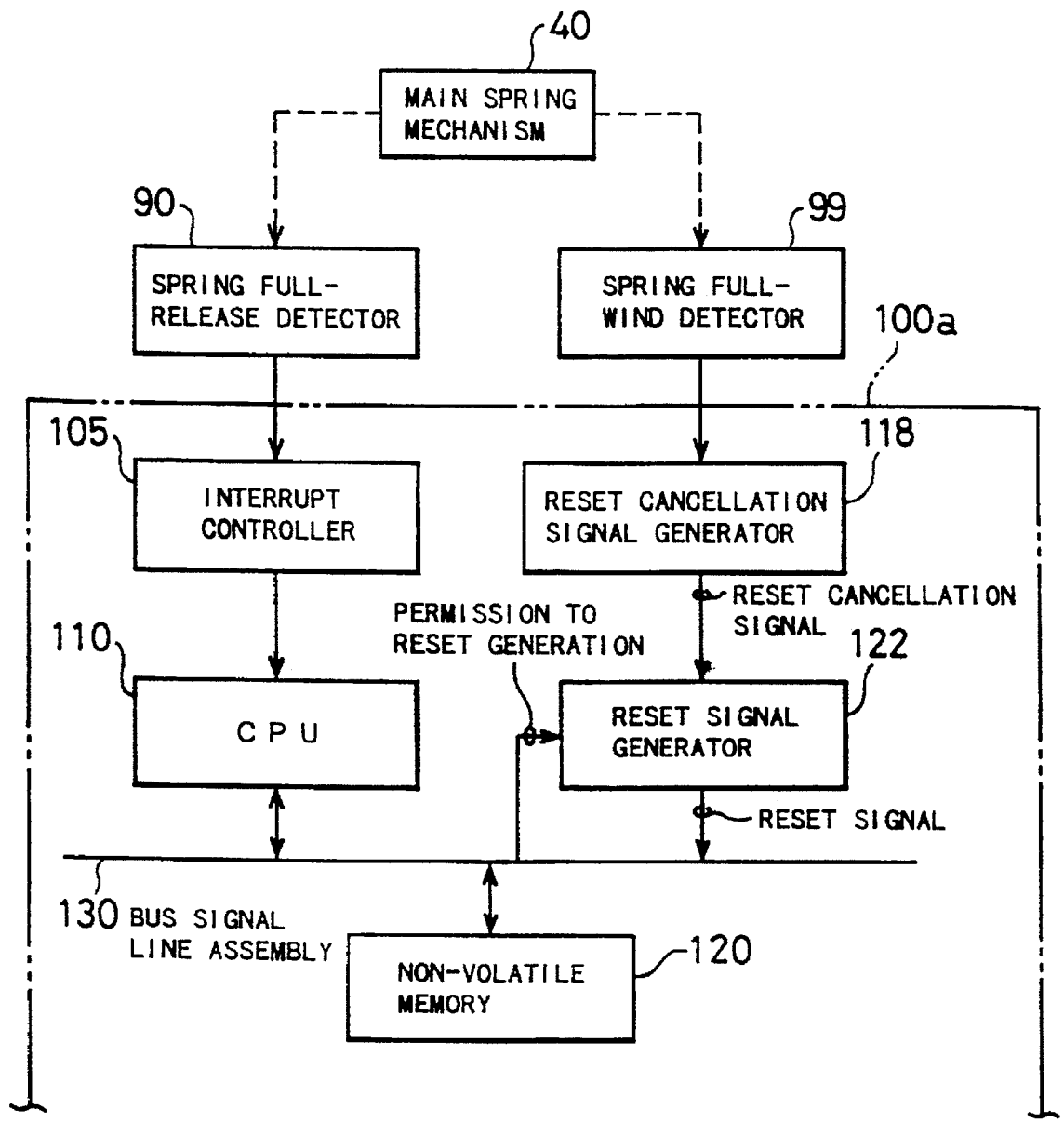
FIG. 11 is a block diagram of a second embodiment system, according to the present invention.

FIG. 11 relates to a second embodiment of the present invention, wherein a spring full-wind detector 99, a reset cancellation signal generator 118, and a reset signal generator 122, are added to a main computer circuit 100a. (The alternative element is designated here and elsewhere by the suffix "a".) A signal from spring-unwound detector 90 is transmitted to CPU 110 via interrupt controller 105, in same way as in first embodiment. CPU 110 begins the interrupt processing and warns a user by an alarm on LCD panel 20 (which shows a message asking the user to wind up mainspring mechanism 40, see FIG. 9). If the user does not wind mainspring mechanism promptly, the output voltage of battery 63 falls below a setpoint. Operation of the system at voltages below the predetermined setpoint is very unreliable.

Figure 12:
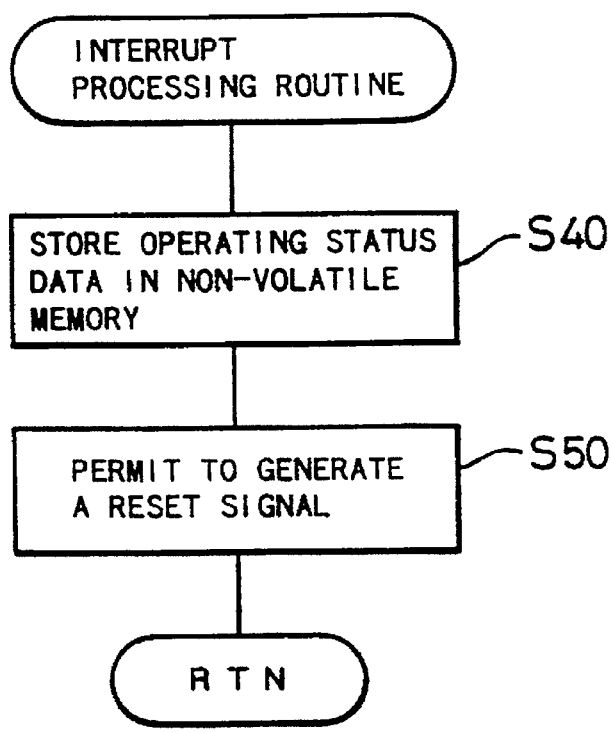
FIG. 12 is a flowchart for an interrupt service routine run by the CPU of FIG. 11.

Immediately before the source voltage falls too low, the interrupt processing routine of FIG. 12 is called, as a consequence of the detector 90 tripping. Step S40 causes program running status information to be stored in nonvolatile memory 120 (FIGS. 3A, 3B, and 11). This permits the system to be restored after being reset and helps to bridge over a power down. The program running status comprises the program counter, register contents (including CPU status register), and interrupt mask level data. Application program data may also be saved. In step S50, a reset enable issues that permits generator 122 to reset the system. Once enabled, reset signal generator 122 will output an active low reset signal to CPU 110. To respond to a hardware reset, CPU 110 executes an internal halt command, and ceases processing. Since the reset signal is active low, a drooping source voltage can only drag the reset line lower, and reset will therefore not be released. The battery voltage can drop even further after reset signal is output. But if the user fully winds mainspring mechanism 40, the resulting electric power generation will build the voltage back up. The spring full-wind detector 99 senses when mainspring 42 has been fully wound, and reset cancellation signal generator 118 outputs a reset cancellation signal to release CPU 110 from reset. Reset signal generator 122, simultaneously returns the reset signal to a high, and CPU 110 begins processing.

The length of time a computer can operate normally after mainspring 42 completely unwinds varies with charge on battery 63 and the type of battery used. So, even if a user starts winding mainspring mechanism 40 immediately, a system without more may produce unreliable results due to the low voltage. But here, the reset signal generator 122, spring full-wind detector 99, and reset cancellation signal generator 118 ensure reliable operation by halting computer 110 before errors can occur. The reset status is latched until mainspring 42 is fully wound, making it impossible to restart computer with mainspring 42 only wound halfway.

Figure 13:
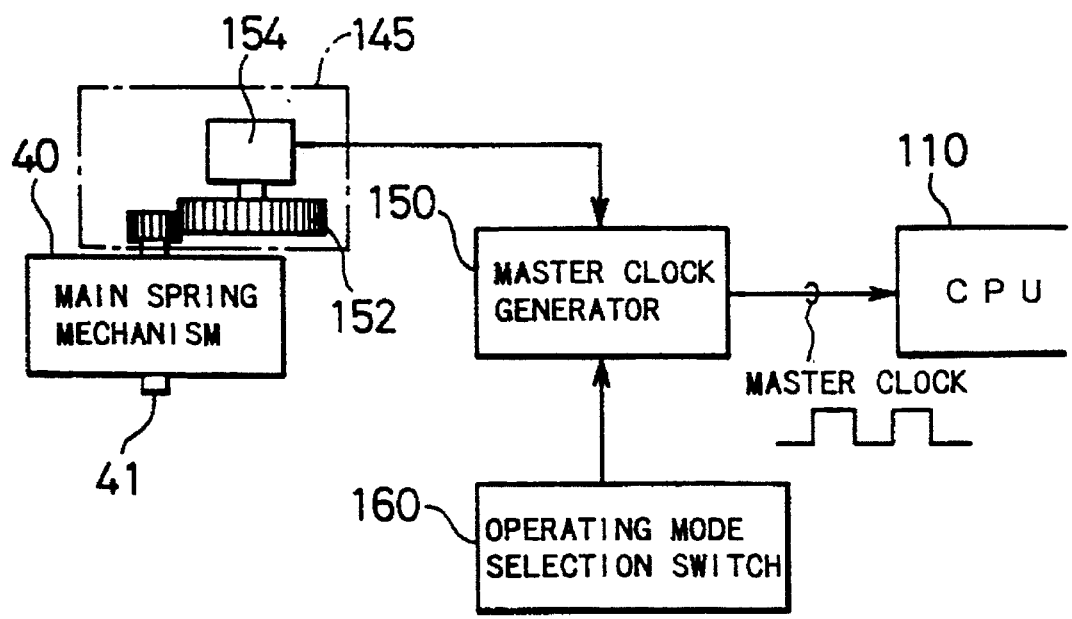
FIG. 13 is a block diagram of a third embodiment system, according to the present invention.
Figure 14:
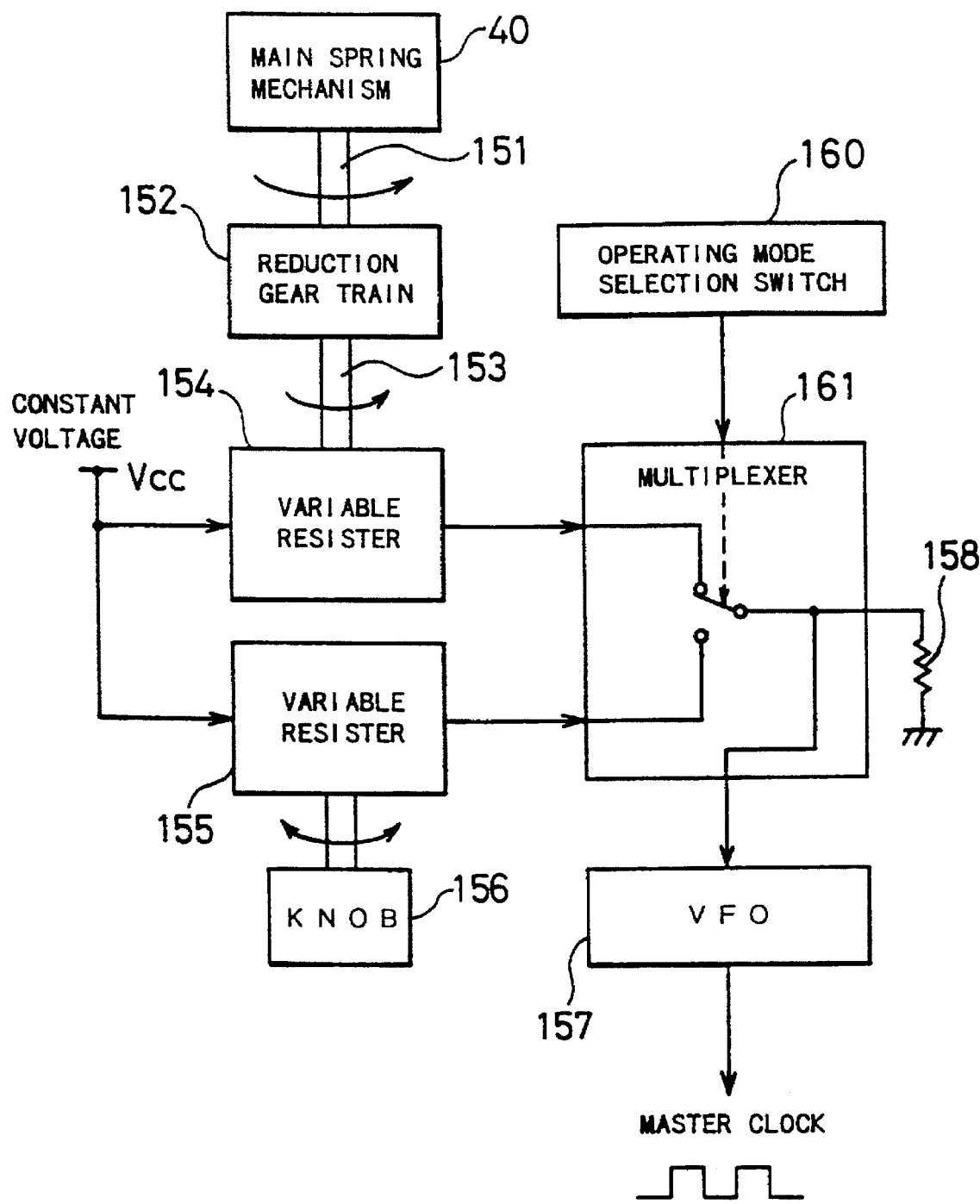
FIG. 14 is a block diagram of the clock generating unit of the system of FIG. 13.

FIGS. 13 and 14 are used here to explain a third embodiment of the present invention. The clock frequency of CPU 110 can be varied. CMOS digital circuits draw power proportional to the clock rate, and slower clocks will use less power. Since modern CPU chips can operate at very high data rates, and since a lot of CPU time is spent waiting for input, the system can afford to have its clock slowed down. The third embodiment is similar to the first embodiment, but this one has a few additional elements. These are a spring winding transducer 145 for giving an analog signal that tracks the tension on mainspring 42, a master clock generator 150 that outputs a frequency which corresponds to input from transducer 145, and an operating mode selection switch 160 for selecting among various operating modes in generator 150. The operating speed of CPU 110 may be varied according to a user's needs, by turning knob 156, or by how much tension mainspring 40 has left. The choice between these modes is selected by switch 160. Switch 160 causes a multiplexer 161 to select one of the two variable resistors 154 and 155. The chosen voltage control is supplied to a voltage-controlled oscillator (VCO) 157.

Since the clock would vary over a large range, the CPU 110 must be able to tolerate varying frequencies, perhaps even down to DC. The Intel i8080 and i8086 series CPUs have signal phase relationships, including internal signals of CPU and bus control signals, that are synchronous to the master clock. Consequently, a change in master clock may result in a phase inversion between signals, preventing their use in this embodiment. The Motorola MC6800 and MC68000 series CPUs have signal phase relationships, including bus control signals, that are not synchronous to the master clock, and as such could be used here. Similar selection criteria should be applied to choosing the peripheral devices.

The spring winding transducer 145 is comprised of a reduction gear train 152 and a variable resistor 154. Gear train 152 reduces spindle 41 rotations by N:1. In the above examples, mainspring mechanism 40 is a 25-turn type, and if the full sweep angle of variable resistor 154 is, for example, 270 degrees, then the ratio should be 33:1. The output voltage at the wiper of variable resistor 154 will be minimum and maximum at the extremes of the mainspring 42 being fully unwound and fully wound. When variable resistor 155 is selected by multiplexer 161, the condition of mainspring mechanism 40 will not affect the master clock frequency. The adjustment of the operating speed of CPU 110 is made by the user in manipulating knob 156. If variable resistor 154 is selected, the master clock is affected as follows. As mainspring mechanism 40 gradually unwinds, variable resistor 154 is rotated via reduction gear train 152 and its resistance will gradually increase. (Resistor 154 is connected as a rheostat.) As a result, the voltage supplied to VCO 157 also falls gradually. The CPU 110 slows down and draws less power, thus conserving what is left. VCO 157 may be an AD650 as manufactured by Analog Devices. An AD650 can have a 100 kHz full-scale output frequency, and at an input voltage of 10 mV, it produces 100 Hz out, and 10 volts input yields the full 100 kHz output. The non-linearity is 50 ppm or less. In the case of a 1 MHz full-scale VCO, the same input voltage swing produces a 1 kHz to 1 MHz output, and non-linearity is about 600 ppm. Resistance values are selected for variable resistor 154 and fixed resistor 158 such that voltage input to VCO 157 will drop about 1 volt when mainspring 42 unwinds by 10%. The output frequency from VCO 157 is 100 kHz when mainspring mechanism 40 is fully wound, and 100 Hz when it is fully unwound. The power drawn by CPU 110 is at a minimum when mainspring 42 unwinds, and it is about 0.01% of maximum. Although the linearity of VCO 157 is quite good, it is not critical, a much less linear VCOs could be used.

Figure 15:
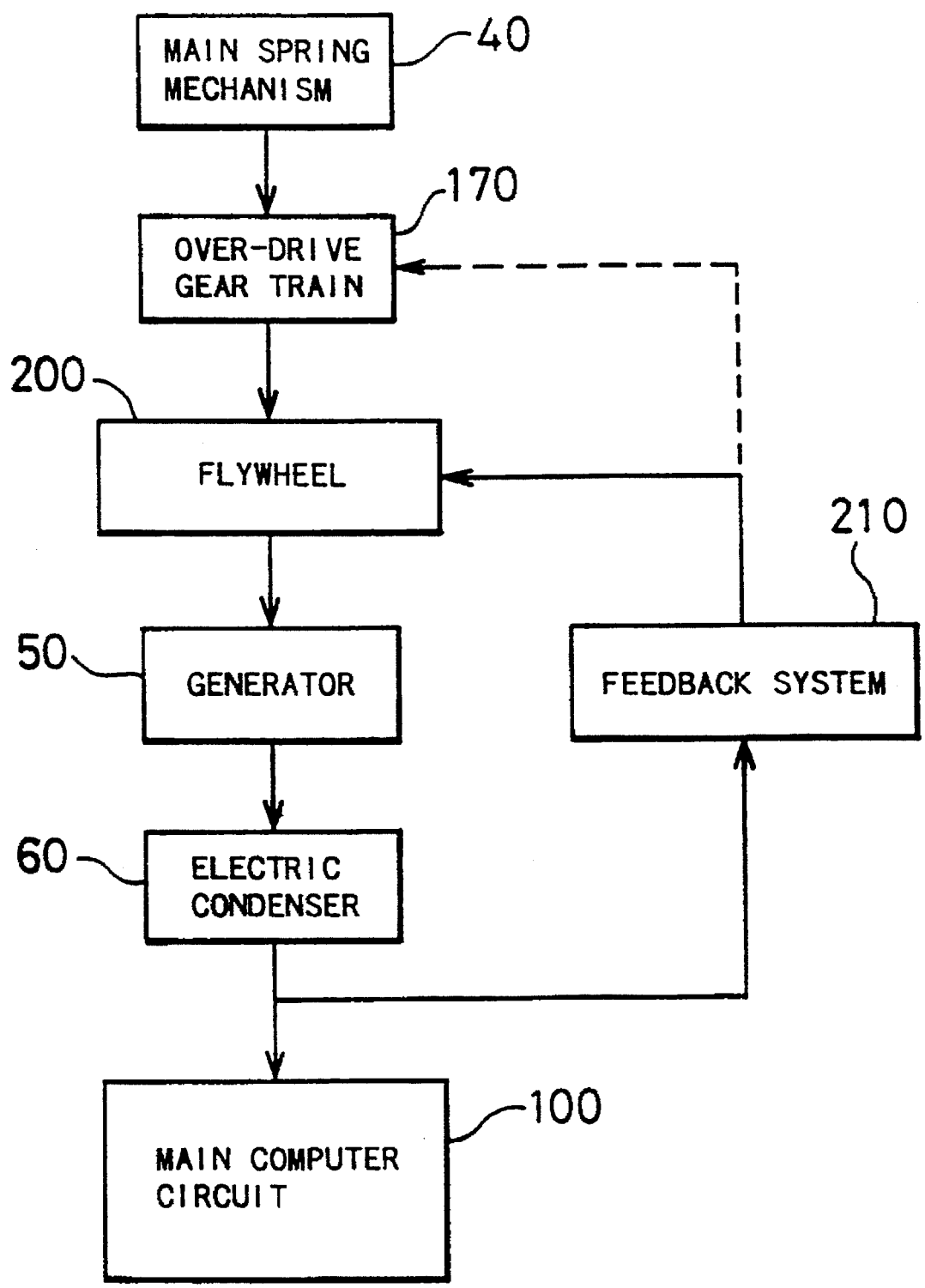
FIG. 15 is a block diagram of a fourth embodiment system, according to the present invention.

A fourth embodiment of the present invention, similar to the first embodiment above, is block diagramed in FIG. 15. It comprises an over-drive gear 170 and a flywheel 200, both in series between mainspring mechanism 40 and generator 50. This embodiment has a feedback system 210 that controls flywheel 200 such that a constant output is output from regulator assembly 60. Feedback system 210 comprises both an electric and a mechanical system working together that detect the output voltage of regulator 60 and works on flywheel 200 to maintain a constant speed. The portable computer represented in FIG. 15 does not have a power supply unit 70, power is supplied directly to main circuit 100 from regulator assembly 60. The advantage is the cost and weight of power supply unit 70 has been eliminated. The voltage regulating function of power supply unit 70 is essentially duplicated by flywheel 200 and feedback system 210. Since a mechanical system typically has a time constant longer than an all electric system, the mechanical system cannot follow the fluctuations in power consumption as precisely. The accuracy of a mechanical system regulation will also be rough. Thus any ICs used in the main computer circuit 100 should have a wide range of operating voltages. With common CMOS type ICs, operation is usually guaranteed for 2 volts to 35 volts.

Figure 16:
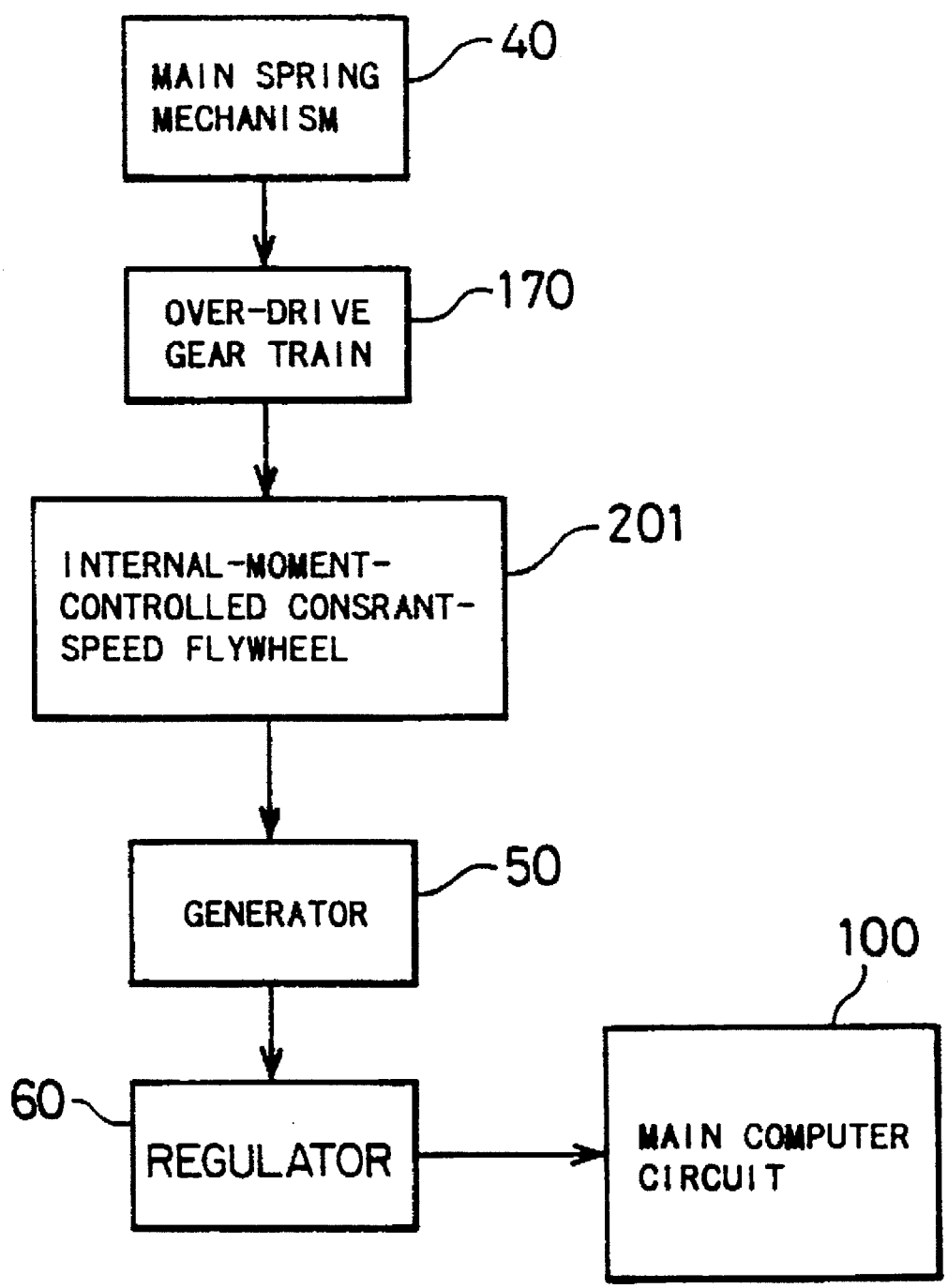
FIG. 16 is a block diagram of a variation on the fourth embodiment.

FIG. 16 is a block diagram of a configuration where feedback system 210 is consolidated into flywheel 200. Fluctuations of load from main computer circuit 100 are not usually very large, so an inertial-moment-controlled constant-speed flywheel 201 will operate well to keep the output voltage of regulator assembly 60 at a constant level.

Figure 17:
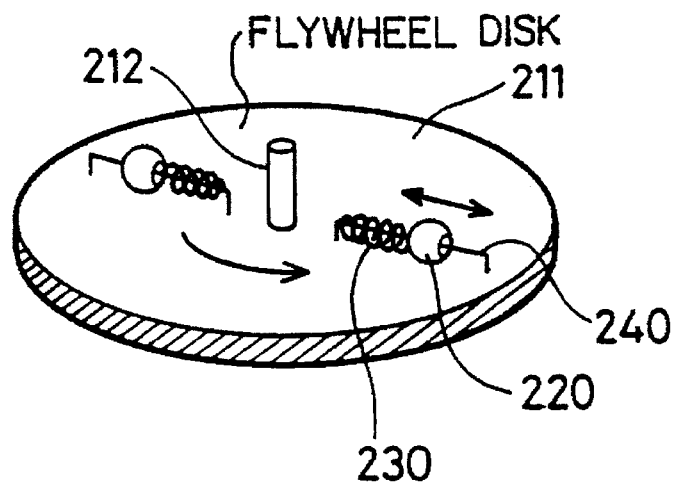
FIG. 17 illustrates a constant-speed flywheel used in the variation of the fourth embodiment.

FIG. 17 illustrates one way to configure the inertial-moment-controlled constant-speed flywheel 201 of FIG. 16, which pits a pair of weights 220, acting under centrifugal force, against a pair of springs 230. The weights will allow flywheel disk 211 to speed up if weights 220 pull in, much the same way an ice figure-skater speeds up a twirl by pulling in his or her arms. But the increased speed will increase the centrifugal force on the weights 220 and that tends to pull them back out. At some point a balance is reached, and flywheel assembly 201 will naturally assume a constant speed. The inertial-moment-controlled constant-speed flywheel 201 comprises a flywheel disk 211 with radially movable weights 220 on it. The weights 220 are fitted moveably on holders 240 which are arranged in a radial direction. They act to stretch coil springs 230 away from an axis 212 (shaft center) of flywheel disk 211. Weights 220 and coil springs 230 are positioned on opposing sides, with axis 212 in middle between them. The centrifugal force F1 applied to weights 220 is expressed by following formula (3):

$$F1 = r\, m\, w^2 \tag{3}$$

where:

r: Radius of the center of gravity of weights 220 m: Mass of weights 220 w: Angular velocity of flywheel disk 211

The tensile force F2 due to spring elasticity is expressed by following formula (4):

$$F2 = k2(r - r0) \tag{4}$$

where k2: the spring constant r0: spring deflection position

Figure 18:
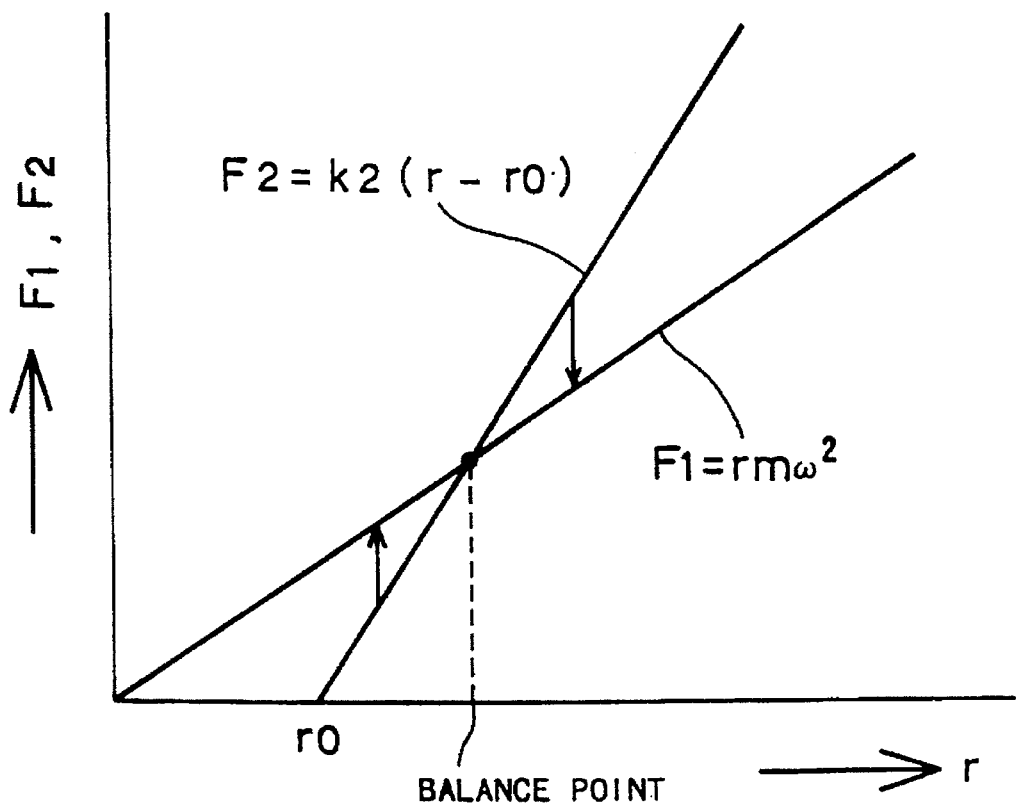
FIG. 18 is a graph plotting the relationship in the constant-speed flywheel between centrifugal force F1 of the fly weights, spring force F2, and rotational speed.

FIG. 18 is a graph of the relationships between position r of weights 220, centrifugal force F1, and tensile force F2. If F1 and F2 are such that there exists an intersecting point on graph, flywheel 201 will have an equilibrium point. The driving force working on axis 212 and the load of generator 50 are pretty much constants, and are substantially smaller than sum of rotational moments of flywheel disk 211 and weights 220. The mass and shape of the weights should be decided first, based on the required time constants of feedback system 210. Then the initial weight position r0 and constant of spring k2 are decided relative to the angular velocity ω (the frequency of rotation). The required feedback control is accomplished by controlling the rotations of the over-drive gear train 170. As is shown in FIG. 5, an actuator 171 can be added to engage one gear of over-drive gear train 170 in order to lock the gear train. When output voltage of regulator 60 increases, CPU 110 will make actuator operate to cut power from mainspring mechanism 40 to power-generating rotor 51. And when the output voltage of regulator 60 drops, CPU 110 de-activates actuator 171 to restore power transmission from mainspring mechanism 40. A 2-position solenoid can be used for actuator 171, to conserve power in both states. Preferably a one-way clutch in used between gear train 170 and flywheel 200 so that rotor 51 will continue to spin even when gear train 170 is locked up by actuator 171.

Figure 19:
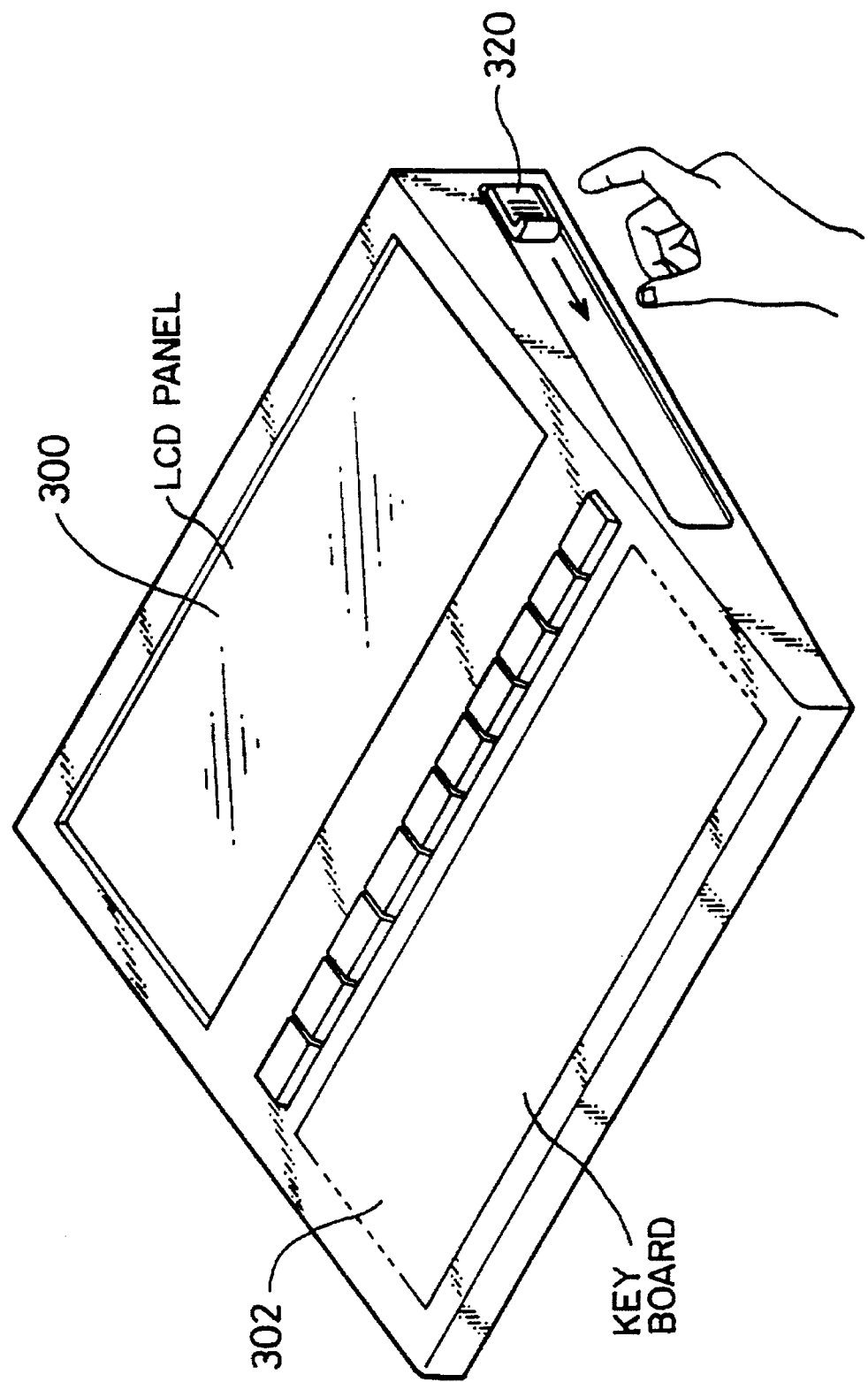
FIG. 19 is a three-dimensional perspective view of a computer according to the present invention that has a spring winding slider on the side of the case.
Figure 20:
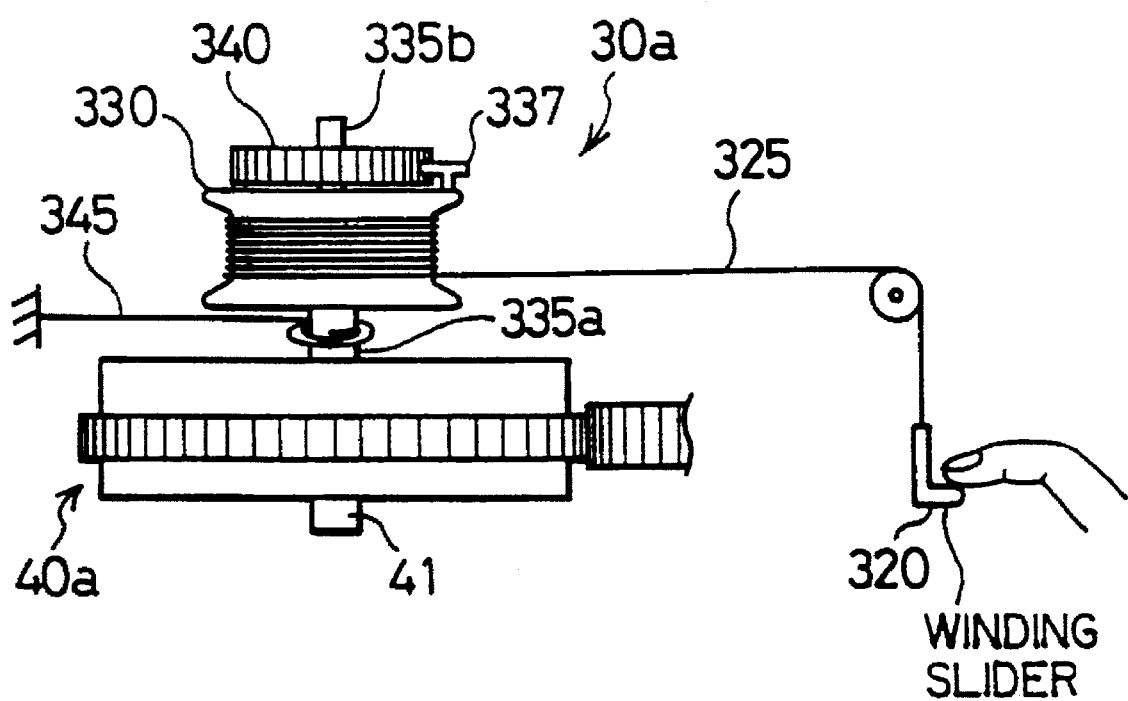
FIG. 20 the spring winder used in the computer of FIG. 19.
Figure 21:
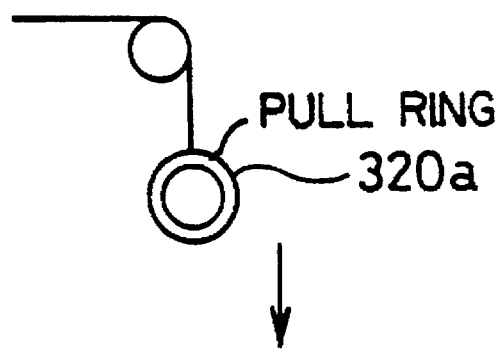
FIG. 21 shows a ring alternative to the L-handle of FIG. 20.

A fifth embodiment of the present invention is shown in FIG. 19, and is a "letter sized" unit comprising an LCD panel 300 and full keyboard 302. The internal configuration is practically the same as the first embodiment. A full keyboard included here and was not in the other. Here, a winding slider 320 connected by a wire 325 (detailed in FIG. 20) to a spring winder assembly 30a is located on a side 310 of the computer. Wire 325 has several turns that wind wound around a drum 330 which is secured to an outer shaft 335a of a double rotating shaft 335. A unidirectional pawl 337 converts the pulling to a single direction turning of shaft 335. A gear 340 is attached at the upper end of an inner shaft 335b of rotating shaft 335. Spindle 41 (mainspring mechanism 40) is joined at the lower end. A torsion-type spring 345 attaches to outer shaft 335a of rotating shaft 335. The other end of spring 345 attaches to a frame and will return to drum 330 to its original position after being spun by pulling on slider 320. Pawl 337 engages gear 340 such that it can turn only in one direction. This is so that when slider 320 is pulled down, the return of wire drum 330 caused by spring 345 will not be transmitted to gear 340. The rotations of gear 340 are transmitted to spindle 41 via inner shaft 335b, and that winds mainspring 42. By a user's pulling of slider 320 several times, the mainspring mechanism can be fully wound. Alternatively, a pull ring 320a, as shown in FIG. 21 can be used in place of slider 320.

Figure 22:
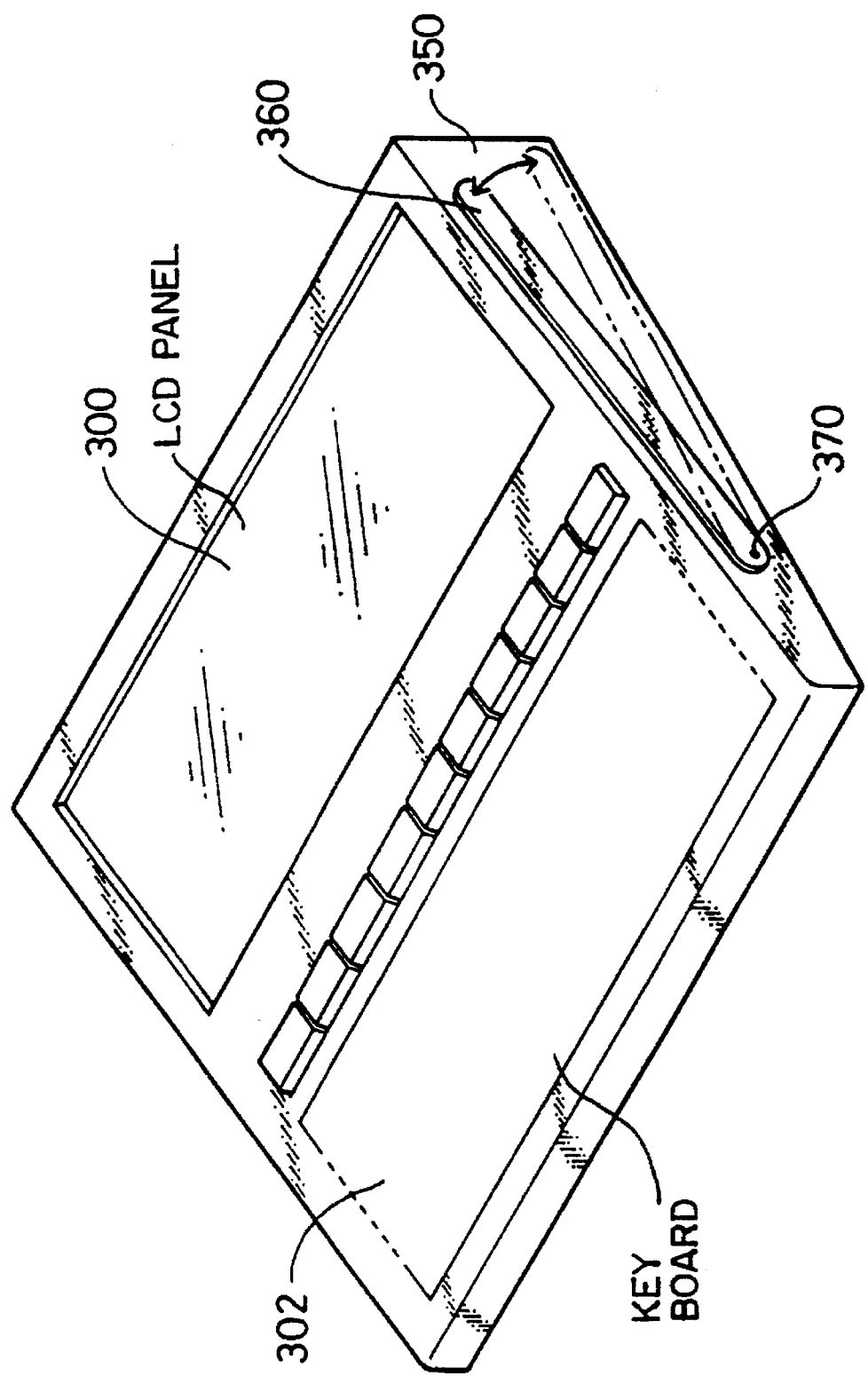
FIG. 22 is a three-dimensional perspective view of a computer according to the present invention that has a spring winding lever arm on the side of the case.

FIG. 22 shows an alternative lever 360 that can be toggled to wind spring winder 30a. A rotating shaft 370, which is attached to handle 360, is geared to outer shaft 335a (FIG. 20).

Figure 23:
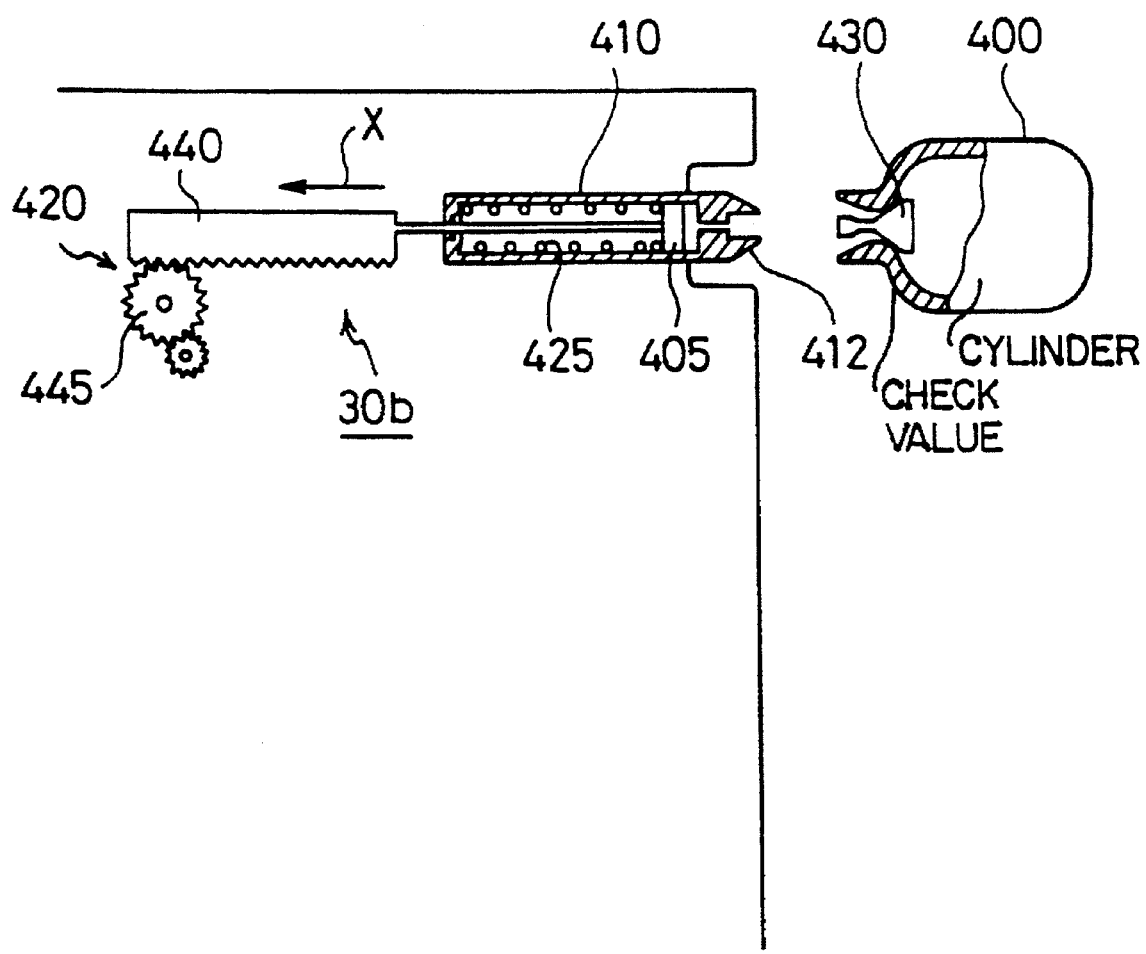
FIG. 23 illustrates a compressed air spring winding mechanism.

FIG. 23 shows a gas powered spring winder 30b, that uses gas cylinders 400 filled with compressed air. Common $CO_2$ cartridges could also be used. Spring winder 30b has a piston 405 in chamber 410 that sits in front of a spring 425. Air pressure introduced to chamber 400 makes piston 405 move in direction "X" causing a gear assembly 420 to wind mainspring mechanism via rack 440 and pinion 445. The cylinder 400 has a check valve 430 that is normally closed by the air pressure inside container. When cylinder 400 is inserted on a connection port 412, check valve 430 opens, and compressed air inside cylinder 400 flows into chamber 410. When cylinder 400 is removed, piston 405 is pushed back to its initial position by spring 425. Pinion 445 reverses, but a one-way clutch prevents any backing up. If cylinder 400 is popped on and off several times, the mainspring mechanism will eventually be fully wound.

Although several various embodiments of the present invention have been described and illustrated here, many alternatives are possible. For example, a configuration where a user's force in pressing the keys on a computer keyboard can be accumulated and used by converting it into electric energy through a piezoelectric device; a configuration of a lap-top computer with a flexible disc drive, where accumulated energy capacity is increased by incorporating a mainspring mechanism of a larger scale (for example, energy to be accumulated is 1,000 times larger if a ten-times thicker spring is used), and a configuration where flat springs, coil springs, elastomer such as rubber, a superconductive coil, and/or a heat accumulator are used as energy accumulation unit.

While the present invention has been described in conjunction with several specific embodiments, it will be evident to those skilled in art that many further alternatives, modifications and variations are possible and desirable, in light of foregoing description. Thus, the invention described here is intended to embrace all such alternatives, modifications, applications and variations as may reasonably fall within true spirit and scope of following claims.

What is claimed is:

1. A portable computer system comprising:

a main computer circuit including a CPU and a memory;

energy accumulation means for accumulating and storing mechanical energy, comprising a spring member for storing mechanical energy, said spring member undergoing a change in position as a function of stored mechanical energy;

energy affording means coupled to said energy accumulation means for affording mechanical energy to said energy accumulation means through operation by a user;

power supply means coupled between said energy accumulation means and said main computer circuit for converting said mechanical energy accumulated and stored in said energy accumulation means into electrical energy and supplying said electrical energy to said main computer circuit;

energy depletion detecting means coupled to said spring member of said energy accumulation means for detecting a drop of said mechanical energy accumulated and stored in said energy accumulation means before said mechanical energy decreases to a lower limit level ensuring normal operation for said main computer circuit, comprising means for detecting the position of said spring member and outputting a signal representing said drop of said mechanical energy based on the detected position of said spring member; and means for altering functioning of said CPU from a first operating state existing prior to receiving said signal output from said energy depletion detecting means to a second operating state of reduced power consumption upon receiving said signal output from said energy depletion detecting means.

2. The portable computer system of claim 1, wherein:

said energy affording means includes a windup key for allowing kinetic energy to be input directly from the user;

said spring member includes a windup spring; and said energy accumulation means includes a gear train coupled between said windup spring and said power supply means.

3. The portable computer system of claim 1, wherein:

said energy accumulation means includes a gear train coupled between said spring member and said power supply means; and said energy affording means includes self-winding means for automatically winding said spring member.

4. The portable computer system of claim 1, wherein:

said spring member of said energy accumulation means includes a windup spring; and said energy affording means includes, a chamber having a connection port for receiving a container storing compressed gas, and a piston housed in said chamber for causing said windup spring to be wound in response to pressure from said compressed gas.

5. The portable computer system of claim 1, wherein said means for altering functioning of said CPU comprises:

operating clock selection means coupled to said energy depletion detection means for selecting an operating clock of said main computer circuit according to said detected position of said spring member.

6. The portable computer system of claim 1, further comprising:

master clock generator means, coupled to said main computer circuit, for supplying master clock signals to said main computer circuit;

said means for altering functioning of said computer comprising varying means for varying a frequency of said master clock signals according to said detected position of said spring member;

adjusting means coupled to said master clock generator means for allowing the user to manually adjust the frequency of said master clock signals of said master clock generator means; and switching means for selecting between said varying means and said adjusting means for operating on said master clock generator means.

7. The portable computer system of claim 1, wherein said means for altering functioning of said CPU comprises:

reset means for maintaining said CPU in a reset state on receiving said signal output from said energy depletion detecting means.

8. The portable computer system of claim 7, wherein said reset means includes:

means for interrupting said CPU on receiving said signal output from said energy depletion detecting means; and means responsive to said interrupting means for maintaining said CPU in a halt condition after said CPU has been interrupted.

9. The portable computer system of claim 7, further comprising:

energy recovery detecting means coupled to said energy accumulation means for detecting, based on the detected position of said spring member, recovery of said mechanical energy stored in said energy accumulation means at a level higher than a level necessary to ensure normal operation for said main computer circuit after said mechanical energy has been afforded to said energy accumulation means by said energy affording means; and cancellation means responsive to said energy recovery detecting means for returning said CPU to said first operating state from said said second operating state.

10. The portable computer system of claim 1, further comprising:

transmitting means comprising a mechanical element coupled between said energy accumulation means and said power supply means for transmitting said mechanical energy to said power supply means;

feedback means for controlling said mechanical element of said transmitting means so that said power supply means produces a constant power output; and electrical energy storing means responsive to an output of said power supply means for storing said electrical energy and supplying said electrical energy to said main computer circuit.

11. The portable computer system of claim 10, wherein said transmitting means includes:

an over-drive gear train coupled to said energy accumulation means; and a flywheel coupled between said overdrive gear train and said power supply means.

12. The portable computer system of claim 10, wherein said transmitting means includes:

an over-drive gear train coupled to said energy accumulation means; and an inertial-moment-controlled constant-speed flywheel coupled between said over-drive gear train and said power supply means for keeping an output of power supply means at a constant level.

13. A method of applying power to a portable computer circuit including a CPU and a memory, comprising:

manually accumulating and storing mechanical energy in a mechanical energy accumulation device including a spring member having a position which varies as a function of accumulated and stored mechanical energy;

converting mechanical energy accumulated in the energy accumulation device into electrical energy and supplying the electrical energy to the main computer circuit;

detecting the position of said spring member to detect a drop of mechanical energy accumulated and stored in the energy accumulation device before the accumulated mechanical energy stored in the mechanical energy accumulation device decreases to a lower limit level at which normal operation of the main computer circuit is ensured;

outputting a signal to the main computer circuit when the detecting step detects that the mechanical energy accumulated and stored in the energy accumulation device is decreased below said lower limit level; and altering functioning of said CPU from a first operating state existing prior to receiving said signal output in said outputting step to a second operating state of reduced power consumption upon receiving said signal output in said outputting step.

14. The method of claim 13, wherein said altering step comprises:

selecting an operating clock of said main computer circuit according to the detected position of said spring member.

15. The method of claim 13, further comprising:

supplying master clock signals to the main computer circuit;

said altering step comprising controlling a frequency of the master clock signals supplied to the main computer circuit based on one of a manual selection by an operator and the detected position of said mechanical element.

16. The method of claim 13, wherein said outputting step comprises outputting a reset signal to said main computer circuit, and said method further comprises:

maintaining said CPU in a reset state upon said main computer circuit receiving said reset signal output in said outputting step.

17. The method of claim 16, comprising:

interrupting the CPU on receiving the reset signal output in said outputting step; and maintaining said CPU in a hold condition after the CPU has been interrupted.

18. The method of claim 16, further comprising:

detecting the position of said spring element to detect recovery of mechanical energy accumulated in the energy accumulation device at a level higher than a level necessary to ensure normal operation for said main computer circuit; and releasing the CPU from said reset state when said recovery of the mechanical energy accumulated in the energy accumulation device is detected.

19. A portable computer system comprising:

a main computer circuit including a CPU and a memory;

energy accumulation means for accumulating and storing mechanical energy, comprising a mechanical element for storing mechanical energy and which undergoes a change in position as a function of stored mechanical energy;

energy affording means coupled to said energy accumulation means for affording mechanical energy to said energy accumulation, means through operation by a user;

power supply means coupled between said energy accumulation means and said main computer circuit for converting said mechanical energy accumulated and stored in said energy accumulation means into electrical energy and supplying said electrical energy to said main computer circuit;

energy depletion detecting means coupled to said mechanical element of said energy accumulation means for detecting a drop of said mechanical energy accumulated and stored in said energy accumulation means before said mechanical energy decreases to a lower limit level ensuring normal operation for said main computer circuit, comprising means for detecting the position of said mechanical element and outputting a signal representing said drop of said mechanical energy based on the detected position of said mechanical element; and means for varying a frequency of a CPU clock signal to reduce power consumption of said CPU on receiving said signal output from said energy depletion detecting means.

20. The portable computer system of claim 19, wherein said mechanical element comprises a spring member.

21. A method of applying power to a portable computer circuit including a CPU and a memory, comprising:

manually accumulating and storing mechanical energy in a mechanical energy accumulation device including a mechanical element having a position which varies as a function of accumulated and stored mechanical energy;

converting mechanical energy accumulated in the energy accumulation device into electrical energy and supplying the electrical energy to the main computer circuit;

detecting the position of said mechanical element to detect a drop of mechanical energy accumulated and stored in the energy accumulation device before the accumulated mechanical energy stored in the mechanical energy accumulation device decreases to a lower limit level at which normal operation of the main computer circuit is ensured; and outputting a signal to the main computer circuit when the detecting step detects that the mechanical energy accumulated and stored in the energy accumulation device is decreased below said lower limit level; and varying a clock frequency of said CPU to reduce power consumption of the CPU in response to outputting of said signal in said outputting step.

22. The method of claim 21, wherein said step of mechanically accumulating and storing energy comprises: winding a spring member.

* * * * *